United States Patent
Anand

(10) Patent No.: US 9,166,837 B2
(45) Date of Patent: Oct. 20, 2015

(54) BASE STATION ASSISTED FREQUENCY DOMAIN EQUALIZATION

(71) Applicant: QUALCOMM Incorporated, San Diego, CA (US)

(72) Inventor: Raghavendra Shyam Anand, Chickballapur (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/170,931

(22) Filed: Feb. 3, 2014

(65) Prior Publication Data
US 2014/0362898 A1 Dec. 11, 2014

Related U.S. Application Data

(60) Provisional application No. 61/833,749, filed on Jun. 11, 2013.

(51) Int. Cl.
*H04L 25/03* (2006.01)
*H04L 25/02* (2006.01)

(52) U.S. Cl.
CPC ...... *H04L 25/03949* (2013.01); *H04L 25/0226* (2013.01); *H04L 25/03159* (2013.01)

(58) Field of Classification Search
CPC ........... H04L 27/2605; H04L 27/2626; H04L 27/2607; H04L 25/03949; H04B 7/2656
See application file for complete search history.

(56) References Cited

U.S. PATENT DOCUMENTS

| | | | |
|---|---|---|---|
| 6,618,452 B1 | 9/2003 | Huber et al. | |
| 6,765,969 B1 | 7/2004 | Vook et al. | |
| 7,149,239 B2 | 12/2006 | Hudson | |
| 7,302,233 B2 | 11/2007 | Onggosanusi et al. | |
| 7,710,857 B2* | 5/2010 | Yousef | 370/208 |
| 2004/0013084 A1* | 1/2004 | Thomas et al. | 370/210 |
| 2005/0068886 A1* | 3/2005 | Wang et al. | 370/210 |
| 2006/0208930 A1* | 9/2006 | Harada | 341/50 |
| 2006/0250940 A1* | 11/2006 | Tirkkonen et al. | 370/208 |
| 2007/0002823 A1* | 1/2007 | Skov Andersen et al. | 370/349 |
| 2007/0258512 A1* | 11/2007 | Green | 375/150 |
| 2011/0116515 A1* | 5/2011 | Van Houtum et al. | 370/479 |
| 2011/0188563 A1 | 8/2011 | Lopez et al. | |
| 2013/0034054 A1* | 2/2013 | Wu et al. | 370/328 |
| 2014/0036934 A1* | 2/2014 | Buckley et al. | 370/474 |

FOREIGN PATENT DOCUMENTS

WO WO-0152493 A1 7/2001

OTHER PUBLICATIONS

3GPP TS 45.002 V10.2.0 (Sep. 2011), 3rd Generation Partnership Project; Technical Specification Group GSM/EDGE Radio Access Network; Multiplexing and multiple access on the radio path (Release 10), 112 pp.

(Continued)

*Primary Examiner* — Kenneth Lam
(74) *Attorney, Agent, or Firm* — Austin Rapp & Hardman

(57) ABSTRACT

A method for wireless communication is described. The method includes receiving a burst that includes controlled sequence symbols transmitted in a guard period. The controlled sequence symbols include the last predetermined number symbols of a training sequence. The burst is demodulated based on the controlled sequence symbols. Other aspects, embodiments, and features are also claimed and described.

26 Claims, 15 Drawing Sheets

(56) References Cited

OTHER PUBLICATIONS

3GPP TS 45.004 V10.0.0 (Mar. 2011), 3rd Generation Partnership Project; Technical Specification Group GSM/EDGE Radio Access Network; Modulation (Release 10), 18 pp.

3GPP TS 45.005 V11.3.0 (Mar. 2013), 3rd Generation Partnership Project; Technical Specification Group GSM/EDGE Radio Access Network; Radio transmission and reception (Release 11), 255 pp.
International Search Report and Written Opinion—PCT/US2014/040182—ISA/EPO—Aug. 11, 2014.

* cited by examiner

BASE STATION ASSISTED FREQUENCY DOMAIN EQUALIZATION

RELATED APPLICATIONS

This application is related to and claims priority from U.S. Provisional Patent Application Ser. No. 61/833,749, filed Jun. 11, 2013, for "BASE STATION ASSISTED FREQUENCY DOMAIN EQUALIZATION."

TECHNICAL FIELD

The present disclosure relates generally to communication systems. More specifically, the present disclosure relates to base station assisted frequency domain equalization.

BACKGROUND

Wireless communication systems are an important means by which many people worldwide communicate. A wireless communication system may provide communication for a number of wireless communication devices, each of which may be serviced by a base station.

Wireless communication systems were originally designed for voice communication. Later, the same infrastructure was used to support low rate data services.

One major concern for users of wireless communication devices is the rate and reliability of data transmissions. Low rates and poor reliability reduce the satisfaction of wireless communication users. Benefits may be realized by increasing data rates and reliability on wireless communication systems.

SUMMARY OF SOME EXAMPLE EMBODIMENTS

Embodiments of the present invention address the above issues as well as others. Indeed, embodiments of the present invention provide power efficient devices, systems, and methods that can alleviate time delays. Doing so can not only utilize power resources efficiently but can aid in minimizing delays associated with network communications.

A method for wireless communication is described. The method includes receiving a burst that includes controlled sequence symbols transmitted in a guard period. The controlled sequence symbols include a last predetermined number of symbols of a training sequence. The method also includes demodulating the burst based on the controlled sequence symbols.

The predetermined number may be in the range of 1 to 8. The controlled sequence symbols may include a cyclic prefix. The cyclic prefix may be an orthogonal frequency division multiplexing cyclic prefix.

The burst may include a right half and a left half. Each half of the burst may include controlled sequence symbols. The burst may be received as a global system for mobile communications (GSM) transmission.

The demodulating may include performing a frequency domain equalization. The frequency domain equalization may be performed based on a circular convolution.

The demodulating may be performed by an orthogonal frequency division multiplexing receiver. The demodulating may be based on forward regression and backward regression.

The demodulating may include determining a bit state probability for each received bit based on all received bits. The method may also include decoding the demodulated burst.

An apparatus for wireless communication is also described. The apparatus includes a processor, memory in electronic communication with the processor and executable instructions stored in the memory. The apparatus receives a burst that includes controlled sequence symbols transmitted in a guard period. The controlled sequence symbols include a last predetermined number of symbols of a training sequence. The apparatus demodulates the burst based on the controlled sequence symbols.

A wireless device is also described. The wireless device includes means for receiving a burst that includes controlled sequence symbols transmitted in a guard period. The controlled sequence symbols include a last predetermined number of symbols of a training sequence. The wireless device also includes means for demodulating the burst based on the controlled sequence symbols.

A computer-program product for wireless communications is also described. The computer-program product includes a non-transitory computer-readable medium having instructions thereon. The instructions include code for causing a wireless communication device to receive a burst that includes controlled sequence symbols transmitted in a guard period. The controlled sequence symbols include a last predetermined number of symbols of a training sequence. The instructions also include code for causing the wireless communication device to demodulate the burst based on the controlled sequence symbols.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION OF ALTERNATIVE & EXEMPLARY EMBODIMENTS

Figure 1:
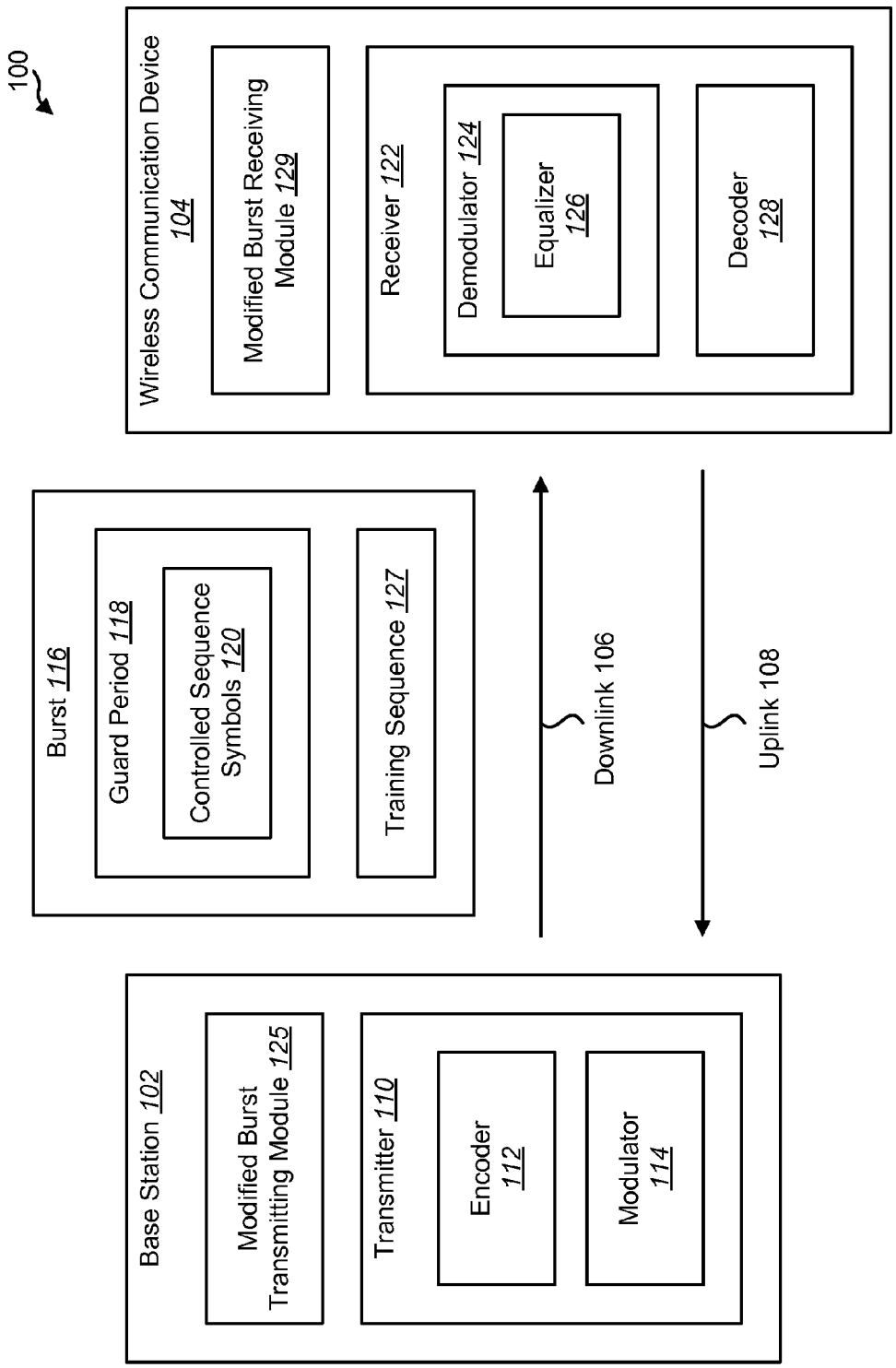
FIG. 1 shows an example of a wireless communication system in which systems and methods for base station assisted frequency domain equalization may be implemented.

FIG. 1 shows an example of a wireless communication system 100 in which systems and methods for base station 102 assisted frequency domain equalization may be implemented. The wireless communication system 100 may include one or more base stations 102 and one or more wireless communication devices 104. Each base station 102 provides communication coverage for a particular geographic area.

As used herein, the term "wireless communication device" refers to an electronic device that may be used for voice and/or data communication over a wireless communication system. Examples of wireless communication devices 104 include cellular phones, personal digital assistants (PDAs), handheld devices, wireless modems, laptop computers and personal computers. A wireless communication device 104 may alternatively be referred to as an access terminal, a mobile terminal, a mobile station, a remote station, a user terminal, a terminal, a subscriber unit, a subscriber station, a mobile device, a wireless device, user equipment (UE), or some other similar terminology.

A base station 102 is a station that may communicate with one or more wireless communication devices 104. A base station 102 may also be referred to as, and may include some, or all, of the functionality of, an access point (including nano-, pico- and femto-cells), a broadcast transmitter, a NodeB, an evolved NodeB, a base transceiver station, etc. The term "base station" will be used herein. Each base station 102 may provide communication coverage for a particular geographic area. A base station 102 may provide communication coverage for one or more wireless communication devices. The term "cell" can refer to a base station 102 and/or its coverage area depending on the context in which the term is used.

Communications in a wireless system 100 (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink 108 and downlink 106 transmissions are on the same frequency region so that the reciprocity principle allows the estimation of the downlink channel from the uplink channel. This enables a transmitting wireless device 104 to extract transmit beamforming gain from communications received by the transmitting wireless device 104.

The wireless communication system 100 may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, $3^{rd}$ Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA, and Low Chip Rate (LCR) while cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable 3rd generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices.

In 3GPP Long Term Evolution (LTE), a wireless communication device 104 may be referred to as a "user equipment" (UE). A wireless communication device 104 may also be referred to as, and may include some or all of the functionality of, a terminal, an access terminal, a subscriber unit, a station, etc. A wireless communication device 104 may be a cellular phone, a personal digital assistant (PDA), a wireless device, a wireless modem, a handheld device, a laptop computer, a Session Initiation Protocol (SIP) phone, a wireless local loop (WLL) station, etc.

Wireless communication devices 104 are typically dispersed throughout the wireless communication system 100. A wireless communication device 104 may communicate with zero, one or multiple base stations 102 on the downlink 106 and/or uplink 108 at any given moment. The downlink 106 (or forward link) refers to the communication link from a base station 102 to a wireless communication device 104, and the uplink 108 (or reverse link) refers to the communication link from a wireless communication device 104 to a base station 102.

The base station 102 may include a modified burst transmitting module 125. In one configuration, the modified burst transmitting module 125 may determine to send a modified burst 116 to the wireless communication device 104. The burst 116 may include controlled sequence symbols 120 transmitted in a guard period 118. In one embodiment, the controlled sequence symbols 120 may include the last eight symbols of the training sequence 127 of the burst 116. In another embodiment, the controlled sequence symbols 120 may include the last predetermined number of symbols of the training sequence 127, where the predetermined number is in the range of 1 to 8. The controlled sequence symbols 120 may be used as a cyclic prefix (e.g., OFDM cyclic prefix) for the transmission.

The base station 102 may include a transmitter 110. The transmitter 110 may format and send the modified burst 116. For example, an encoder 112 may encode the controlled sequence symbols 120 in the guard period 118 of the burst 116. A modulator 114 may modulate the burst 116 based on a higher-level modulation scheme (e.g., 8-PSK, QPSK, QAM and/or 64-QAM).

The wireless communication device 104 may receive the burst 116. In one configuration, the wireless communication device 104 may include a receiver 122 that receives the burst 116 on a downlink 106 transmission. The receiver 122 may be an orthogonal frequency division multiplexing (OFDM) receiver. The receiver 122 may include a demodulator 124 and a decoder 128. The demodulator 124 may demodulate the burst 116 based on the controlled sequence symbols 120. For example, the equalizer 126 may perform frequency domain equalization based on a circular convolution using the controlled sequence symbols 120. The controlled sequence symbols 120 may form a cyclic prefix that facilitates frequency domain equalization.

In one configuration, the demodulator 124 may demodulate the burst 116 based on a forward regression and a backward regression. For example, the demodulator 124 may determine the probability of the state of each received bit based on all bits received in the burst 116.

In one embodiment, a modified burst receiving module 129 may detect if the received burst 116 is a modified burst 116 by trying to detect modified transmission bits (e.g., the controlled sequence symbols 120) in the guard period 118. If the modified burst receiving module 129 determines that controlled sequence symbols 120 are present in the guard period 118, the decoder 128 may use modified burst decode algorithms to decode the burst 116.

Figure 2:
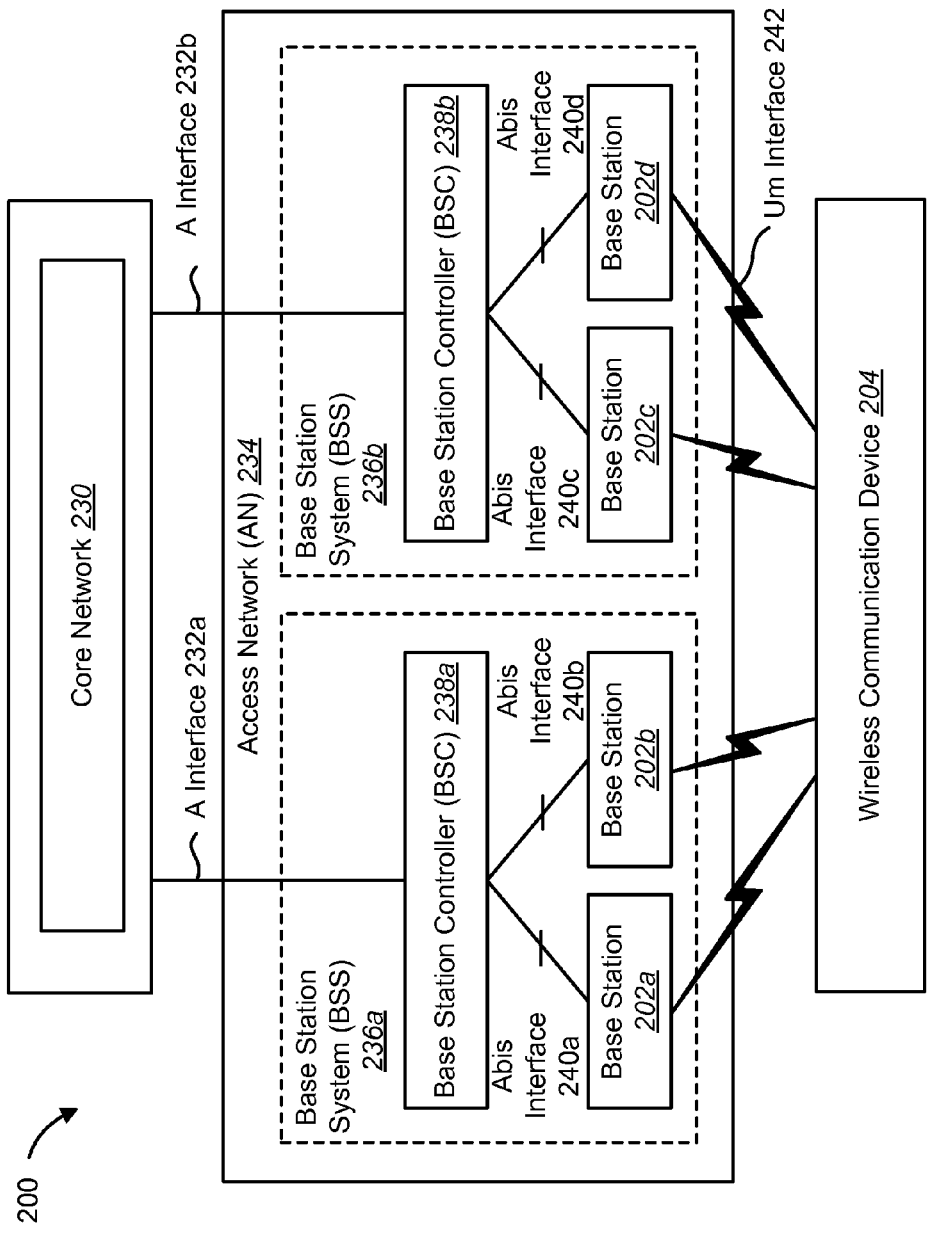
FIG. 2 is a block diagram illustrating a radio network operating according to embodiments of the present invention.

FIG. 2 is a block diagram illustrating a radio network 200 operating according to embodiments of the present invention. The radio network 200 may operate according to Global System for Mobile Communications (GSM) standards and may be referred to as a GSM network. A GSM network is a collective term for the base stations 202*a-d* and the control equipment for the base stations 202*a-d* (e.g., base station controllers (BSCs) 238*a-b*) the GSM network may contain, which make up the access network (AN) 234. The GSM network provides an air interface access method for the wireless communication device 204. Connectivity is provided between the wireless communication device 204 and the core network 230 by the GSM network. The access network (AN) 234 may transport data packets between multiple wireless communication devices 204.

The GSM network is connected internally or externally to other functional entities by various interfaces (e.g., an A interface 232*a-b*, an Abis interface 240*a-d*, and a Um interface 242). The GSM network is attached to a core network 230 via an external interface (e.g., an A interface 232*a-b*). The base station controllers (BSCs) 238*a-b* support this interface. In addition, the base station controllers (BSCs) 238*a-b* manage a set of base stations 202*a-d* through Abis interfaces 240*a-d*. A base station controller (BSC) 238*a* and the managed base stations 202*a-b* form a base station system (BSS) 236*a*. A base station controller (BSC) 238*b* and the managed base stations 202*c-d* form a base station system (BSS) 236*b*. The Um interface 242 connects a base station 202 with a wireless communication device 204, while the Abis interface 240 is an internal interface connecting the base station controller (BSC) 238 with the base station 202.

The radio network 200 may be further connected to additional networks outside the radio network 200, such as a corporate intranet, the Internet, or a conventional public switched telephone network. The radio network 200 may transport data packets between each wireless communication device 204 and such outside networks.

GSM is a widespread standard in cellular, wireless communication. GSM is relatively efficient for standard voice services. However, high-fidelity audio and data services require higher data throughput rates than that for which GSM is optimized. To increase capacity, the General Packet Radio Service (GPRS), EDGE (Enhanced Data rates for GSM Evolution) and UMTS (Universal Mobile Telecommunications System) standards have been adopted in GSM systems. In the GSM/EDGE Radio Access Network (GERAN) specification, GPRS and EGPRS provide data services. The standards for GERAN are maintained by the 3GPP (Third Generation Partnership Project). GERAN is a part of GSM. More specifically, GERAN is the radio part of GSM/EDGE together with the network that joins the base stations 102 (the Ater and Abis interfaces 240) and the base station controllers (A interfaces 232, etc.). GERAN represents the core of a GSM network. It routes phone calls and packet data from and to the PSTN (Public Switched Telephone Network) and Internet to and from remote terminals. GERAN is also a part of combined UMTS/GSM networks.

GSM employs a combination of Time Division Multiple Access (TDMA) and Frequency Division Multiple Access (FDMA) for the purpose of sharing the spectrum resource. GSM networks typically operate in a number of frequency bands. For example, for uplink 108 communication, GSM-900 commonly uses a radio spectrum in the 890-915 megahertz (MHz) bands (Mobile Station to Base Transceiver Station). For downlink 106 communication, GSM 900 uses 935-960 MHz bands (base station 202 to wireless communication device 204). Furthermore, each frequency band is divided into 200 kHz carrier frequencies providing 124 RF channels spaced at 200 kHz. GSM-1900 uses the 1850-1910 MHz bands for the uplink 108 and 1930-1990 MHz bands for the downlink 106. Like GSM 900, FDMA divides the spectrum for both uplink 108 and downlink 106 into 200 kHz-wide carrier frequencies. Similarly, GSM-850 uses the 824-849 MHz bands for the uplink 108 and 869-894 MHz bands for the downlink 106, while GSM-1800 uses the 1710-1785 MHz bands for the uplink 108 and 1805-1880 MHz bands for the downlink 106.

Each channel in GSM is identified by a specific absolute radio frequency channel (ARFCN). For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800. Also, each base station 202 is assigned one or more carrier frequencies. Each carrier frequency is divided into eight time slots (which are labeled as time slots 0 through 7) using TDMA such that eight consecutive time slots form one TDMA frame with a duration of 4.615 milliseconds (ms). A physical channel occupies one time slot within a TDMA frame. Each active wireless communication device 204 or user is assigned one or more time slot indices for the duration of a call. User-specific data for each wireless communication device 204 is sent in the time slot(s) assigned to that wireless communication device 204 and in TDMA frames used for the traffic channels.

Figure 3:
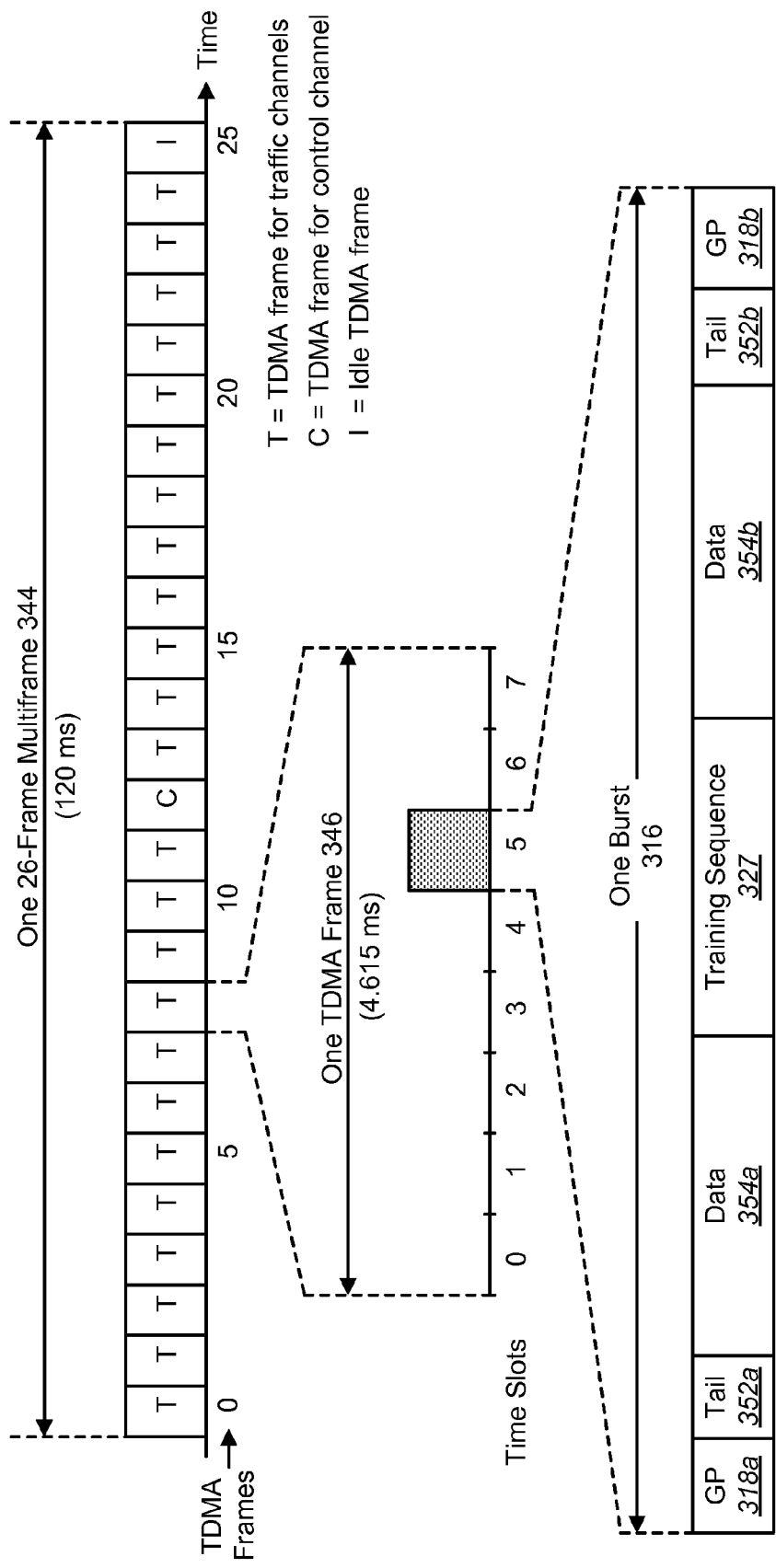
FIG. 3 shows example multiframe, frame and burst formats in global system for mobile communications (GSM)

FIG. 3 shows example multiframe 344, frame 346 and burst 316 formats in GSM. The timeline for transmission is divided into multiframes 344. For traffic channels used to transmit user-specific data, each multiframe 344 in this example includes 26 TDMA frames 346, which are labeled as TDMA frames 0 through 25. The traffic channels are sent in TDMA frames 0 through 11 and TDMA frames 13 through 24 of each multiframe 344. A control channel is sent in TDMA frame 12. No data is sent in idle TDMA frame 25, which is used by the wireless communication devices 104 to make measurements of signals transmitted by neighbor base stations 102.

Each time slot within a frame 346 is also referred to as a "burst" 316 in GSM. Each burst 316 includes two tail fields 352*a-b*, two data fields 354*a-b*, a training sequence (also referred to as a midamble) field 327 and guard periods (GP) 318*a-b*. A burst 316 may include symbols for the tail 352*a-b*, data 354*a-b*, and training sequence 327 fields. In one configuration, the symbols included in the burst 316 may be bits. The tail field 352 may include 3 bits. The data field 354 may include 58 bits. The training sequence 327 may include 26 bits. The guard period 318 may have a length of 8.25 bits. However, according to GSM standards, no symbols are sent (e.g., transmitted) in the guard period 318. TDMA frames 346 of a particular carrier frequency are numbered and formed in groups of 26 or 51 TDMA frames 346 called multiframes 344.

Figure 4:
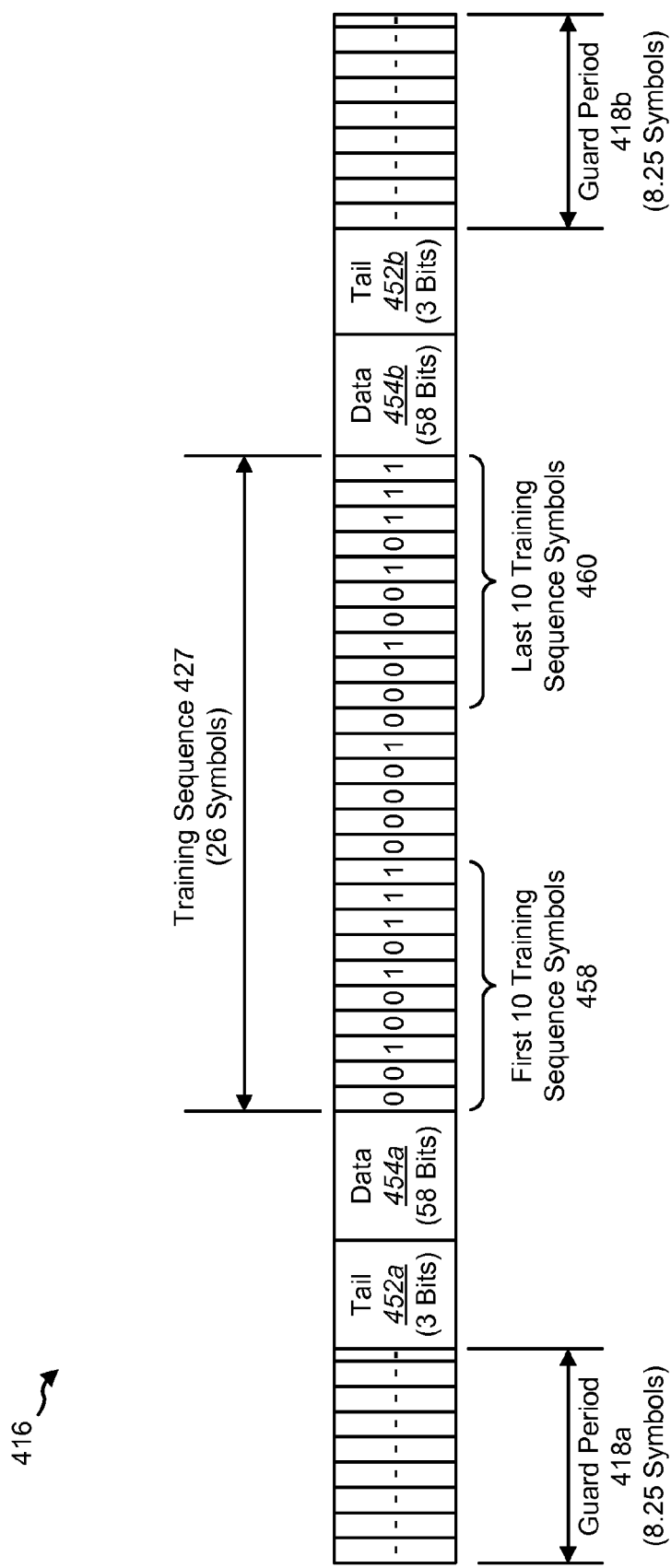
FIG. 4 shows a more detailed example of a burst format in GSM.

FIG. 4 shows a more detailed example of a burst 416 format in GSM. In its original design, a conventional GSM system functioned as a TDMA system. According to this implementation, each TDMA frame 346 may be divided into eight slots. Therefore, eight voice channels (from eight wireless communication devices 104, for instance) may be multiplexed on the eight slots. This was the original design goal of the GSM system. Later, the same infrastructure was used to support low-rate data services.

Because GSM is a duplex communication system, the slots may be linked in uplink (UL) 108 and downlink (DL) 106. For example, slot 0 in UL 108 is linked with slot 0 in DL 106. Therefore, a wireless communication device 104 may receive an ARFCN pair, where an ARFCN pair may include one ARFCN in the UL 108 and one ARFCN in the DL 106. The wireless communication device 104 may also receive a slot number. The wireless communication device 104 may communicate using the slot number by sending data over a corresponding slot in a TDMA fashion. For example, the wireless communication device 104 may send data in one slot for every TDMA frame 346, which are 4.615 milliseconds (ms).

Because of the mobility of a wireless communication device 104, and because users may be in different places and may attempt to communicate with the same base station 102, a guard period 418 may be implemented between two slots. The traditional purpose of this guard period 418 is to ensure that a transmission from one wireless communication device 104 does not cause interference to the next slot that includes transmissions to another wireless communication device 104. For example, if a first wireless communication device 104 is using slot 0 and a second wireless communication device 104 is using slot 1, then slot 0 transmissions of the first wireless communication device 104 should not interfere with slot 1 transmissions of the second wireless communication device 104. Therefore, in a conventional GSM system, the base station 102 does not transmit anything in the guard period 418.

By not transmitting in the guard period 418, two adjacent bursts 416 on the DL 106 may not interfere with each other. In one implementation, 8.25 guard period symbols 418 are provided on the DL 106 to ensure that a burst 416 does not cause interference to the next burst 416.

At the receiver 122 of the wireless communication device 104, an equalizer 126 may determine the sequence of the symbols in the burst 416 based on a training sequence 427. In the conventional GSM implementation, the equalizer 126 may start at a training sequence 427 and progress towards the tail bits 452 for both the left half and the right half of the burst 416. GSM uses a midamble, in which the 26 training sequence 427 symbols are in the middle of the burst 416. The midamble may also be referred to as a pilot in the middle of the burst 416. The first ten training sequence symbols 458 may be the same as the last ten training sequence symbols 460.

The data bits 454*a-b* may be on either side of the midamble. For example, 58 data bits 454*a* may be on the left side of the midamble and 58 data bits 454*b* may be on the right side of the midamble. Furthermore, 3 tail bits 452*a-b* and 8.25 guard period symbols 418*a-b* may be on either side of the burst 416. The active part of the burst 416 does not include the guard period symbols 418*a-b*. Therefore, in a conventional GSM system, the wireless communication device 104 may receive symbols starting with the first 3 tail bits 452 through the last 3 tail bits 452. The wireless communication device 104 may then attempt to demodulate and decode the received symbols.

The GSM system, originally designed for voice, may use a Gaussian filtered minimum shift keying (GMSK) modulation, which is a variant of binary phase-shift keying (BPSK) modulation. The GMSK modulation may include a pulse shaping filter, which may introduce intersymbol interference (ISI) symbols. Furthermore, an over the air (OTA) channel may also introduce additional ISI, depending on channel delay spread duration. The intersymbol interference (ISI) in the GSM system may vary depending on a fading channel profile. For example, a typical urban propagation model may include 3 symbols (e.g., 3 GMSK taps+1 OTA tap in typical urban (TU)). A hilly terrain propagation model may include 7 symbols (e.g., 3 GMSK taps+5 OTA taps in hilly terrain (HT)). The GSM system may have to accommodate for a 20 quarter-symbol delay of the channel (e.g., 5 symbols) combined with the 3 symbol delay of the pulse shaping filter, which will come to 7 GSM symbols (e.g., 28 quarter-symbols). The effective channel may be a convolution of the GMSK pulse shaping filter and OTA channel taps.

For demodulation, the wireless communication device 104 may equalize the received symbols by removing the intersymbol interference (ISI) symbols. For example, the wireless communication device 104 may first estimate the channel using the training sequence 427. The channel estimation may be performed in either the time domain or the frequency domain. The wireless communication device 104 may then equalize the received symbols using a maximum likelihood sequence estimation (MLSE) equalizer. The MLSE equalizer is a trellis-based equalizer. In a conventional GSM system, an MLSE equalizer may be used because the number of resolvable channel paths is low, which results in low complexity. The number of resolvable channel paths may be the same as the number of channel taps. An MLSE equalizer may start from the midamble and develop the sequence of bits to the right and to the left of the midamble. In this way, an MLSE equalizer may try to decode the burst 416. Therefore, the MLSE equalizer may develop the sequence of 58 data bits 454 on the left half and right half of the burst 416 almost independently.

However, a midamble-based transmission that uses a trellis-based equalizer (e.g., MLSE equalizer) may result in a high bit error rate (BER) for the bits farther away from the pilot (e.g., training sequence symbols 427). Furthermore, MLSE equalization becomes prohibitively costly as the order of modulation is increased. For higher-order modulations (e.g., 8-PSK, QPSK, QAM, etc.), sub-optimal trellis-based equalizers (e.g., a decision-feedback sequence estimation (DFSE) equalizer) may be used. A DFSE equalizer may use decision feedback equalization (DFE) and MLSE. However, if slots on adjacent ARFCNs are multiplexed in the DL 106, symbol time may decrease and the DFE may become inefficient.

The multiplexing of slots on adjacent ARFCNs in the DL 106 is not straightforward in the case of a legacy burst 416. To improve this, controlled transmissions in the guard period 418 may help the equalizer 126, as illustrated in connection with FIG. 6. Because of the cyclic prefix nature and synchronous transmission of bursts 416 on adjacent ARFCNs, as described by the systems and methods herein, the multiplexing slots on adjacent ARFCNs in the DL 106 may occur without additional effort. This can be used to improve a frequency reuse factor of a GSM base station 102.

Figure 5:
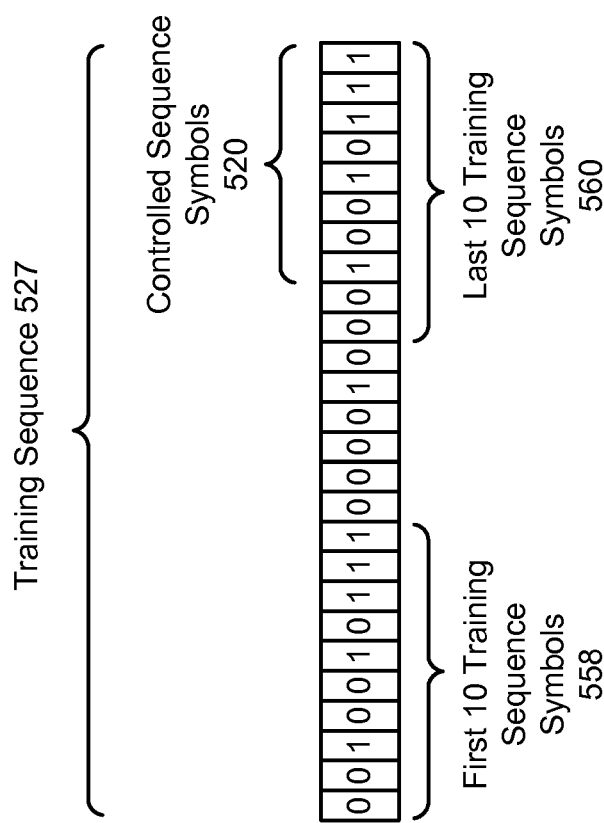
FIG. 5 shows one example of a training sequence according to the systems and methods described herein.

FIG. 5 shows one example of a training sequence 527 according to the systems and methods described herein. In each of the conventional GSM training sequences 527 (e.g., TSC0 to TSC7) that may be used in a normal burst 316, the first ten training sequence symbols 558 are the same as the last ten training sequence symbols 560.

In one embodiment, the base station 102 may send the last eight symbols of the training sequence 527 as controlled sequence symbols 520 in the 8.25 symbol guard period 318. In other words, the base station 102 may transmit additional training sequence 527 symbols in a guard period 318 that correspond to the last eight symbols of the training sequence 527. In the embodiment illustrated in FIG. 5, training sequence 0 is used. However, the disclosed systems and methods are applicable for all eight conventional training sequences 527 of GSM.

In a conventional GSM guard period 318, the guard time is sufficient to accommodate 33 quarter-symbols (e.g., 8.25 symbols). This 33 quarter-symbol time is sufficient for the transmission of a first wireless communication device 104 to finish and avoid interference with the transmission of a second wireless communication device 104. This is the traditional purpose of the guard period 318.

However, with respect to GSM downlink (DL) 106 transmissions, a guard period 318 may not be needed. Because the DL 106 transmissions are synchronous, the DL 106 transmissions will not collide. For example, for a DL 106 transmission, the burst 316 of slot 0 will not collide with the burst 316 of slot 1 because these bursts 316 are all coming from the same base station 102. Therefore, in the case of a DL 106 transmission, the guard period 318 may only be used to avoid interference due to a delay spread (which may be 28 symbols) and is well accommodated in a 33 symbol guard period 318.

The guard period 318 may provide for transmission attenuation for the period between bursts 316 with a ramp up and down occurring during the guard periods 318. A base station 102 is not required to ramp down and up between adjacent bursts 316, but may ramp down and up for non-used timeslots. In any case where the amplitude of a transmission is ramped up and down, applying an appropriate modulation bit stream interference to other RF channels may be minimized.

Before the first bit of the bursts 316 enters the modulator 114, the modulator 114 may have an internal state as if a modulating bit stream made up of consecutive ones (e.g., di=1) had entered the differential encoder 112. Also, after the last bit of the time slot, the modulator 114 may have an internal state as if a modulating bit stream made up of consecutive ones (e.g., di=1) had continued to enter the differential encoder 112. These bits may be called dummy bits and define the start and the stop of the active and the useful part of the burst 316. The GSM standards do not specify the actual phase of the modulator output signal outside the useful part of the burst 316.

According to GSM standards, a base station 102 should be capable of not transmitting a burst 316 in a time slot not used by a logical channel or where discontinuous transmission (DTX) applies. A reference level of 0 dB may correspond to the output power level. In one configuration, the output power during the guard period 318 between every two consecutive active timeslots should not exceed the level allowed for the useful part of the first timeslot, or the level allowed for the useful part of the second timeslot plus 3 dB, whichever is higher.

It should be noted that transmitting in the guard period 318 when there is another burst 316 in the next slot does not violate GSM standards. When there is no burst 316 on the left side or right side of active burst 316, a transmission in the guard period 318 with same power as the active burst 316 is allowed. Therefore, a base station 102 may transmit inside the guard period 318 with the same power as the active part of the burst 316.

Therefore, a modified DL 106 transmission may be used to facilitate frequency domain equalization. For example, a base station 102 may modify its DL 106 transmissions. Instead of sending the normal (e.g., legacy) burst 316, as described in connection with FIG. 4, the base station 102 may modify the transmission by sending the last eight symbols of the training sequence 527 as controlled sequence symbols 520 in the guard period 318. Therefore, the controlled sequence symbols 520 may be additional training sequence 527 symbols included in the burst 316. This modified burst 316 may provide for the use of effective frequency domain equalizers.

By using the cyclic nature of the training sequence 527, a wireless communication device 104 may estimate the channel in the frequency domain. Furthermore, using the cyclic nature of the base station 102 transmissions, the wireless communication device 104 may efficiently equalize the channel in the frequency domain, as described in more detail below in connection with FIG. 6. This may reduce the error vector magnitude (EVM) of the equalized symbols so that higher modulation schemes (e.g., 64-QAM) may be effectively used for DL 106 transmissions.

Figure 6:
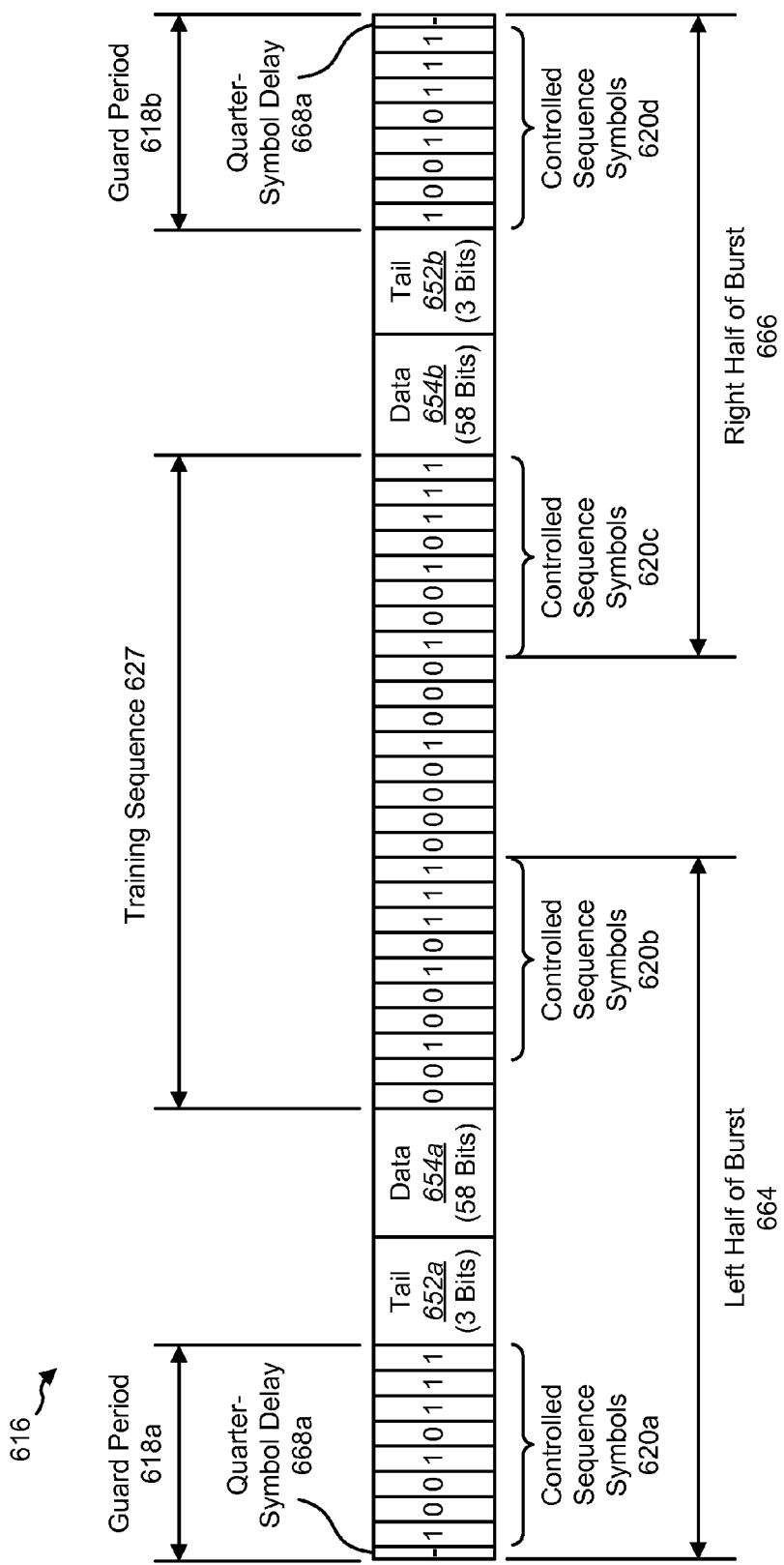
FIG. 6 shows an embodiment of a modified burst.

FIG. 6 shows an embodiment of a modified burst 616. Each half of the burst 616 may include 3 tail bits 652$a$-$b$, 58 data bits 654$a$-$b$ and an 8.25 bit guard period 618$a$-$b$. Controlled sequence symbols 620$a$,$d$ may be transmitted in the guard period 618. In one embodiment, the controlled sequence symbols 620$a$,$d$ may be the last 8 bits of the training sequence 627 as described above in connection with FIG. 5. Each half of the burst 616 may also include a one quarter-symbol delay 668$a$-$b$.

Because of these modified transmissions, the wireless communication device 104 may receive a cyclic prefix for both the left half of the burst 664 and the right half of the burst 666. The modified burst 616 (with cyclic prefix) may help the wireless communication device 104 to decode the burst 616. For example, the first half of the burst 616 (e.g., the left half of the burst 664) may include the additional training sequence 627 symbols (e.g., the controlled sequence symbols 620*a*) as a cyclic prefix. This may be similar to an OFDM cyclic prefix where the tail of the burst 616 appears at the beginning of the burst 616 to provide a cyclic prefix. Therefore, the sequence of symbols (e.g., the controlled sequence symbols 620*a*) at the beginning of the left half of the burst 664 is the same as the sequence of symbols (e.g., the controlled sequence symbols 620*b*) at the end of the left half of the burst 664.

The maximum delay spread that may be experienced on a GSM channel is 28 quarter-symbols, including the delay because of the pulse shaping filter. Therefore, the 8 symbol cyclic prefix that is added may be accommodated by this delay spread. Furthermore, this cyclic prefix may function similar to a cyclic prefix of an OFDM signal.

In the right half of the burst 666, the controlled sequence symbols 620*d* may be added at the end of the burst 616. In one embodiment, these controlled sequence symbols 620*d* may include the last eight symbols of the training sequence 627 as described above in connection with FIG. 5. Because the right half of the burst 666 starts from the last eight symbols of the training sequence 627 (e.g., the controlled sequence symbols 620*c*) and ends with the controlled sequence symbols 620*d* transmitted in the guard period 618, the last eight symbols of the training sequence 627 may function as a cyclic prefix.

Furthermore, because the cyclic prefix is included in the modified burst 616, the convolution of the transmission may be a circular convolution. It should be noted that the normal burst 616 of a conventional GSM transmission does not provide a circular convolution. In a conventional GSM transmission, the convolution over a channel may appear linear to the wireless communication device 104. Therefore, in a conventional GSM system, the wireless communication device 104 may assume that data is circular convolved with a channel, to compensate for the linear convolution. However, by transmitting controlled sequence symbols 620 in the guard period 618*a-b*, the burst 616 actually includes a circular convolution over the channel. Therefore, according to the described systems and methods, a frequency domain equalization may be performed based on the circular convolution. In other words, frequency domain equalization may be possible because the modified burst 616 makes the linear convolution over the channel (of a conventional GSM transmission) look like a circular convolution to the wireless communication device 104. This will simplify the receiver 122 design and improve receiver 122 performance. For example, the receiver 122 of the wireless communication device 104 may operate as an OFDM receiver, which may use the circular convolution.

Figure 11:
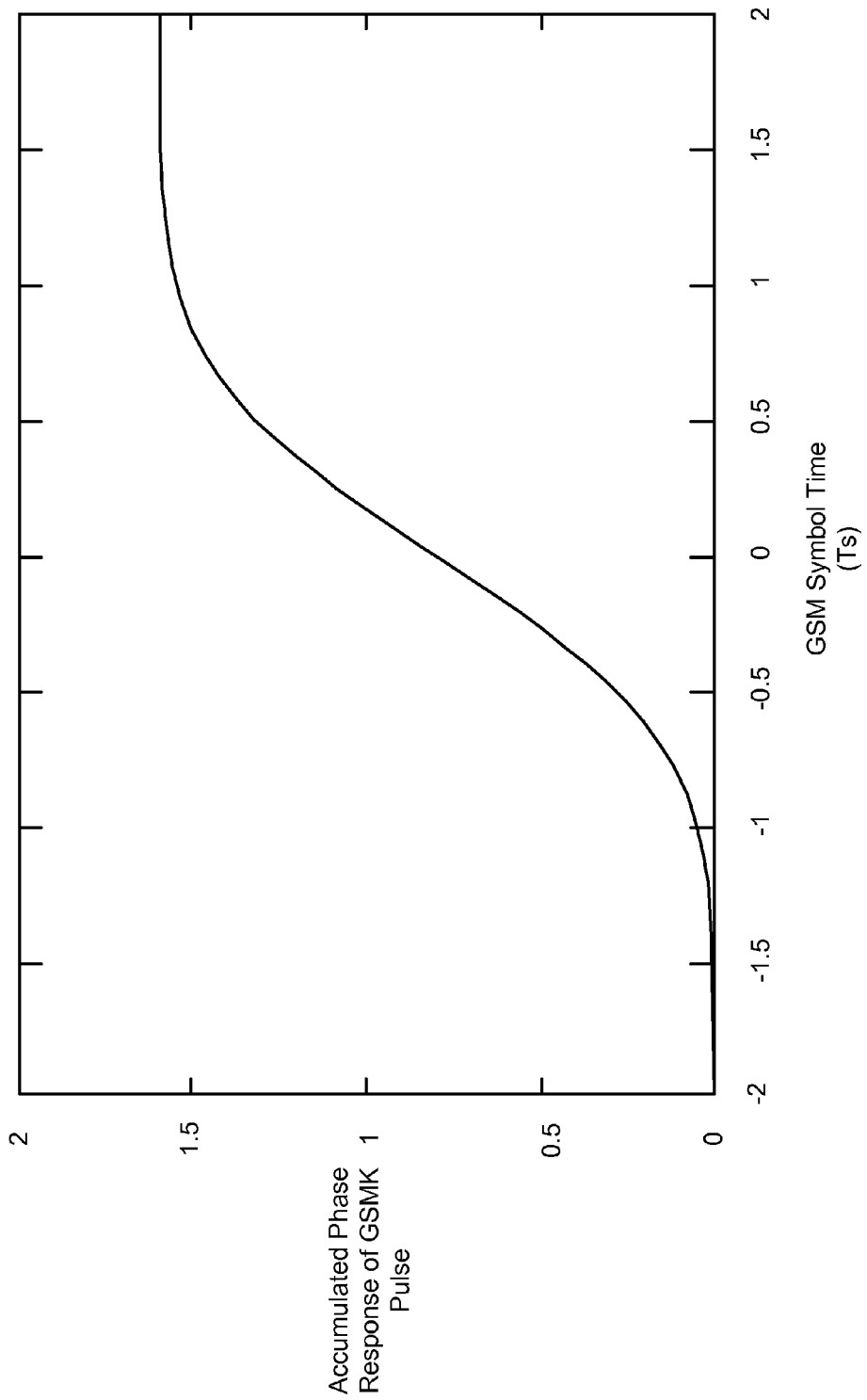
FIG. 11 is a graph illustrating a phase response of a Gaussian minimum shift keying (GMSK) pulse.

In one embodiment, the overall channel seen from the wireless communication device 104 may be a convolution of a GMSK pulse shape and a channel delay spread, which may be 7 taps. An example of a GMSK pulse shape is illustrated in FIG. 11. The 7 tap channel may be represented as h[0], h[1] . . . h[6]. A conventional (e.g., normal) GSM burst 616 (with guard period 618) may go through the channel and some burst 616 energy may spill into the guard period 618. The guard period 618 is 8.25 symbols, which is more than the total time spread of the channel (e.g., 7 symbols maximum). The structure for the received symbols y when x is transmitted (where L=7 is the channel length) may be represented according to Equation (1).

$$y[n] = \sum_{l=0}^{L-1} h[l]x[n-l] \quad (1)$$

Based on Equation (1), at the start of the burst 616, the first eight received symbols (0-7) may be represented according to Equations (2) through (9).

$$y[0]=h[0]x[0] \quad (2)$$

$$y[1]=h[0]x[1]+h[1]x[0] \quad (3)$$

$$y[2]=h[0]x[2]+h[1]x[1]+h[2]x[0] \quad (4)$$

$$y[3]=h[0]x[3]+h[1]x[2]+h[2]x[1]+h[3]x[0] \quad (5)$$

$$y[4]=h[0]x[4]+h[1]x[3]+h[2]x[2]+h[3]x[1]+h[4]x[0] \quad (6)$$

$$y[5]=h[0]x[5]+h[1]x[4]+h[2]x[3]+h[3]x[2]+h[4]x[1]+h[5]x[0] \quad (7)$$

$$y[6]=h[0]x[6]+h[1]x[5]+h[2]x[4]+h[3]x[3]+h[4]x[2]+h[5]x[1]+h[6]x[0] \quad (8)$$

$$y[7]=h[0]x[7]+h[1]x[6]+h[2]x[5]+h[3]x[4]+h[4]x[3]+h[5]x[2]+h[6]x[1]+h[7]x[0] \quad (9)$$

Furthermore, based on Equation (1), at the end of the burst 616, the last received symbols (148-154) may be represented according to Equations (10) through (16).

$$y[148]=h[1]x[147]+h[2]x[146]+h[3]x[145]+h[4]x[144]+h[5]x[143]+h[6]x[142]+h[7]x[141] \quad (10)$$

$$y[149]=h[2]x[147]+h[3]x[146]+h[4]x[145]+h[5]x[144]+h[6]x[143]+h[7]x[142] \quad (11)$$

$$y[150]=h[3]x[147]+h[4]x[146]+h[5]x[145]+h[6]x[144]+h[7]x[143] \quad (12)$$

$$y[151]=h[4]x[147]+h[5]x[146]+h[6]x[145]+h[7]x[144] \quad (13)$$

$$y[152]=h[5]x[147]+h[6]x[146]+h[7]x[145] \quad (14)$$

$$y[153]=h[6]x[147]+h[7]x[146] \quad (15)$$

$$y[154]=h[7]x[147] \quad (16)$$

Because y is not periodic in a conventional (e.g., normal) GSM burst 616, if the wireless communication device 104 attempts to perform a discrete Fourier transform (DFT) for the received sequence, the wireless communication device 104 may not obtain an exact relationship of the convolution in the time domain changing to multiplication in the frequency domain. However, by appending the samples of the training sequence 627 (as in the modified burst 616 described herein) and then dividing the received burst 616 into a left half 664 and a right half 666, y may be assumed to be a periodic sequence formed by the convolution of two periodic sequences x and h. The period of x, h and y is same. Such a convolution is a circular convolution. If a DFT is taken for the samples of y in one period, the circular convolution becomes a multiplication in the frequency domain, as illustrated by Equation (17).

$$Y[k]=X[k]H[k] \quad (17)$$

In Equation (17), sequence {x[n]} and sequence {X[k]} are related by the discrete Fourier transform {X[k]}=DFT({x

[n]}). Furthermore, sequence {y[n]} and sequence {Y[k]} are related by the discrete Fourier transform {Y[k]}=DFT({y[n]}).

In one embodiment, a frequency domain equalization may include generating an inverse system with a frequency response C[k], such that $\Sigma \|X[k]-C[k]Y[k]\|^2$ is minimized. If an input sequence x[n] is assumed to be white (because the bits may be randomized by an interleaver, for instance), then differentiating with respect to C[k] and taking the expectation results in $$C[k] = \frac{conj(H[k])}{S_{yy}[k]} \approx \frac{conj(H[k])}{\|Y[k]\|^2}. \qquad (18)$$

As illustrated in Equation (18), the power spectral density (PSD) $S_{yy}$ of the received symbols may be approximated by the amplitude spectrum $S_{yy}$ of the received symbols. The frequency response C[k] may be multiplied by the result of Equation (17) to obtain the equalized symbols in the frequency domain, as illustrated in Equation (19). Because the frequency response C[k] may be the inverse channel, multiplying by C[k] will remove ISI from the received symbols (e.g., equalize the received symbols). The equalized symbols may then be converted to the time domain by taking the inverse definite Fourier transform (IDFT) of the equalized symbols Z[k], as illustrated in Equation (20), where the IDFT relates all samples of Z[k] to each sample of z[n].

$$Z[k]=C[k]*Y[k] \qquad (19)$$

$$\{z[n]\}=IDFT(\{Z[k]\}) \qquad (20)$$

The systems and methods described herein may also improve bit error rates. With a conventional GSM system, the bit rate experienced by a decision-feedback sequence estimation (DFSE) equalizer is a function of the position of the bit in the burst 616. A DFSE equalizer (e.g., DFE+MSLE) may be used to remove the tail and MLSE may be used for the dominant taps in the beginning. Typically four MLSE taps are used and three DFE taps are used. This reduces the complexity significantly and a pre-filter may be used to convert the channel impulse response to a minimum phase or a maximum phase (for the left half or right half of the burst 664, 666). However, as the bit moves away from the training sequence 627, the probability of error increases. Therefore, with a bit that is placed very close to the training sequence 627, the probability of error is low. However, with a bit that is placed far away from the training sequence 627, the probability of error is high.

A trellis-based equalizer (e.g., an MLSE equalizer), may determine the probability of a bit ending up on a particular state. For example, for a particular transmission, a GMSK modulation may be used with 3 tap channels and four states. A trellis-based equalizer may attempt to determine the probability that a bit in the transmission will end up on state 0 through state 3 (e.g., $S_0$, $S_1$, $S_2$, $S_3$) based on all the bits received up to that point. This probability may be expressed as a function (e.g., $S_0(n-1)$, $S_1(n-1)$, $S_2(n-1)$, $S_3(n-1)$), which is the probability that a bit is in a particular state (e.g., $S_0$, $S_1$, $S_2$, $S_3$) considering all the bits received up to time n−1. This may be referred to as a forward metric.

Similarly, the trellis-based equalizer may attempt to determine the probability that a bit in the transmission will end up on state 0 through state 3 (e.g., $B_0$, $B_1$, $B_2$, $B_3$) based on all the bits that are received in the future. This probability may be expressed as a function (e.g., $B_0(n+1)$, $B_1(n+1)$, $B_2(n+1)$, $B_3(n+1)$), which is the probability that a bit is in a particular state (e.g., $B_0$, $B_1$, $B_2$, $B_3$) considering all the bits that will be received up to time n+1. This may be referred to as a backward metric. For example, upon receiving all the bits, the bits may be buffered and the probability (e.g., $B_0(n+1)$, $B_1(n+1)$, $B_2(n+1)$, $B_3(n+1)$) may be determined.

However, because the trellis in a conventional GSM transmission is not cylindrical, the equalizer 126 cannot determine the probability of the bit state symmetrically for all bits received. As the bits move away from the training sequence 627, the equalizer 126 has progressively less information with which to compute the backward metric.

With the modified burst 616 structure described herein, however, the equalizer 126 of the wireless communication device 104 may treat the transmission as a cylindrical structure. In one embodiment, the equalizer 126 may perform a forward regression and a backward regression and establish a probability of a particular bit state (e.g., 1 or 0) based on all bits, not just the bits that are adjacent. Therefore, the modified burst 616 may facilitate the use of more efficient data receivers 122, compared to the MLSE equalizers used in conventional GSM systems. Furthermore, with this mechanism (e.g., the modified burst 616), the wireless communication device 104 may utilize a frequency domain equalizer.

Because the trellis of the modified burst 616 is cylindrical, the equalizer 126 may compute the bit state probabilities (e.g., $S_0(n-1)$ and $B_0(n+1)$, etc.) based on all the received bits. For example, the received bits of the left half of the burst 664 may be 3 tail bits 652a, 57 data bits, 1 FACH bit and 8 TSC bits. These bits may be referred to as bits 0 to 68. To compute the forward metric (e.g., $S_0(n-1)$) for bit 1, the equalizer 126 may start at bit 2, progress ahead to bit 68, and then go back to bit 0. This is due to the cylindrical trellis of the modified burst 616. Similarly, to compute the backward metric (e.g., and $B_0(n+1)$) of bit 3, the equalizer 126 may start from bit 2, progress to bit 0, jump to bit 68 and progress back to bit 4. Therefore, using these two metrics (e.g., the forward metric and the backward metric), the equalizer 126 may more reliably determine the probability that a bit will end up on a particular state at time n. This may result in increased decoding reliability.

In order to provide backwards compatibility for legacy wireless communication devices 104, a base station 102 may choose whether to transmit a legacy burst 616 or the modified burst 616. Guard period 618 bits of GSM are DTX bits (e.g., no transmission). Therefore, if a base station 102 chooses not to transmit (by setting the power to zero, for instance) in the guard period 618, then base station 102 operation is backward compatible. If the base station 102 transmits in the guard period 618 and a legacy wireless communication device 104 is present in an adjacent slot, the tail bits of the legacy wireless communication device 104 may experience interference from the guard period 618.

Depending on the channel delay spread, this may result in a maximum interference of 3 GSM symbols. In this case, the bit error rate (BER), and hence frame error rate (FER), of the legacy wireless communication device 104 increases or receiver quality (RXQUAL) drops. The base station 102 may decide whether to continue or stop transmitting in the guard period 618 based on the RXQUAL reported by the legacy wireless communication device 104. Typical urban channel profiles have 3 to 4 strong taps (including the GMSK pulse shape). Therefore, interference to a legacy wireless communication device 104 is negligible.

A wireless communication device 104 may detect if a modified burst 616 is transmitted by trying to detect for modified transmission bits (e.g., the controlled sequence symbols 620) in the guard period 618. Based on this detection, the wireless communication device 104 may either use legacy algorithms or modified burst decode algorithms to decode the burst 616. It should be noted that no explicit communication from base station 102 is needed for indicating to the wireless communication device 104 about a modified burst 616 transmission.

Figure 7:
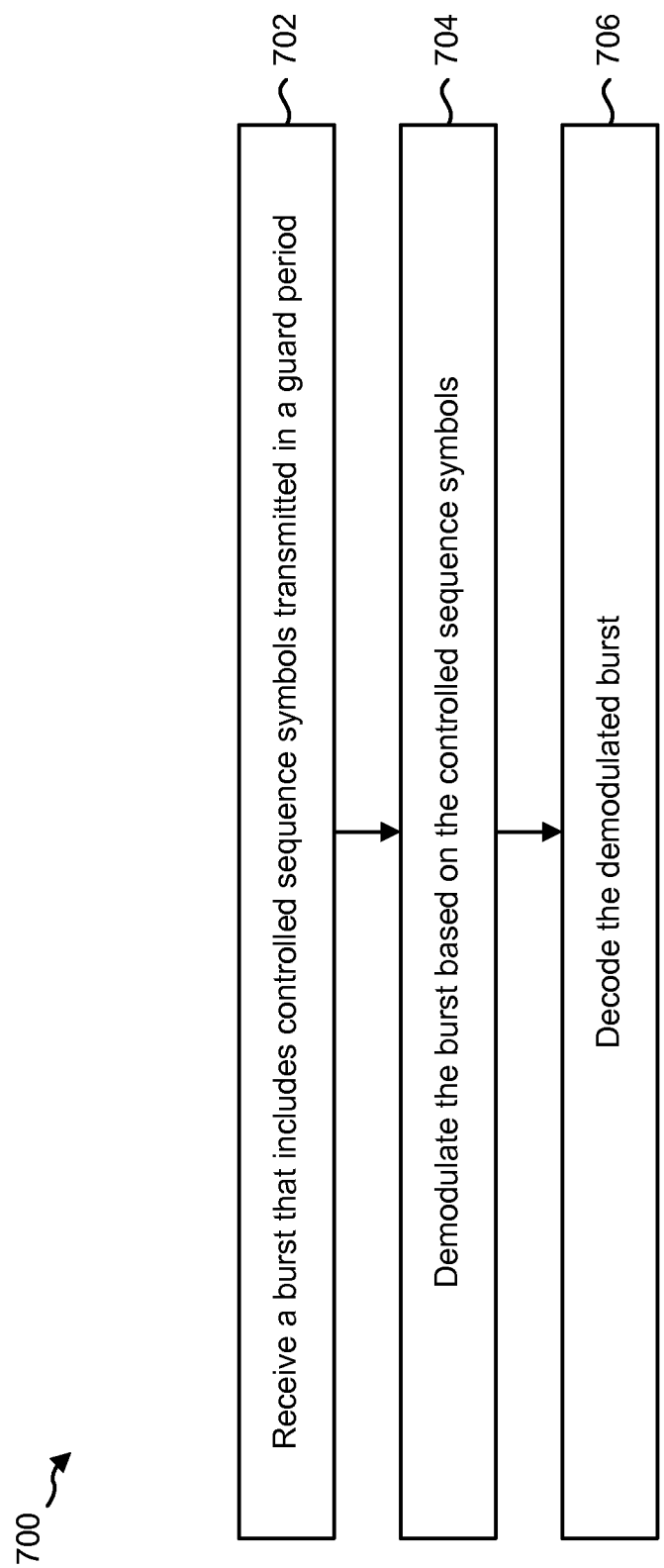
FIG. 7 is a flow diagram of a method for performing base station assisted frequency domain equalization.

FIG. 7 is a flow diagram of a method 700 for performing base station 102 assisted frequency domain equalization. The method 700 may be performed by a wireless communication device 104. The wireless communication device 104 may receive 702 a burst 616 that includes controlled sequence symbols 620 transmitted in a guard period 618. The burst 616 may be received 702 from a base station 102 in a GSM downlink 106 transmission.

In one embodiment, the controlled sequence symbols 620 may include the last predetermined number of symbols of the training sequence 627 of the burst 616. The predetermined number may be in the range of 1 to 8. In other words, the controlled sequence symbols 620 may include up to the last eight symbols of the training sequence. 627. The controlled sequence symbols 620 may be used as a cyclic prefix (e.g., OFDM cyclic prefix) for the transmission. The burst 616 may include a left half 664 and a right half 666. Each half of the burst 664, 666 may include the controlled sequence symbols 662. Furthermore, the burst 616 may be modulated based on a higher-level modulation scheme (e.g., 8-PSK, QPSK, QAM and/or 64-QAM).

The wireless communication device 104 may demodulate 704 the burst 616 based on the controlled sequence symbols 620. The demodulation 704 may include frequency domain equalization, which may be performed based on a circular convolution using the controlled sequence symbols 620. In one embodiment of the invention, the demodulation 704 may be performed by an OFDM receiver. Furthermore, the wireless communication device 104 may demodulate 704 the burst 616 based on a forward regression and a backward regression. The demodulation 704 may also include determining the probability of the state of each received bit based on all bits received in the burst 616.

Upon demodulating 704 the burst 616, the wireless communication device 104 may decode 706 the demodulated burst 616. For example, the wireless communication device 104 may deinterleave and decode the demodulated data to output decoded data.

Figure 8:
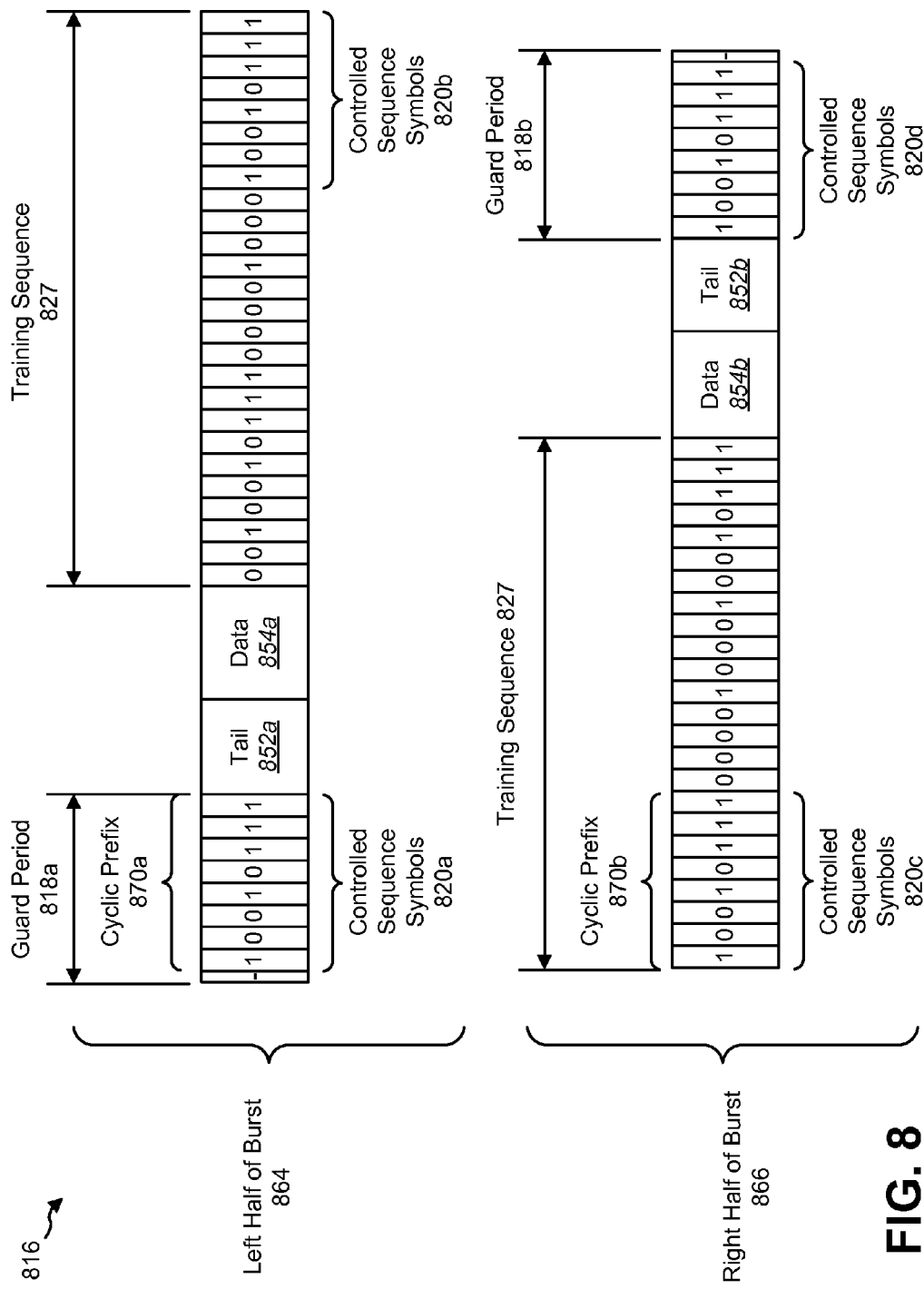
FIG. 8 shows another embodiment of a modified burst.

FIG. 8 shows another embodiment of a modified burst 816. In this embodiment, the burst 816 may include a left half 864 and a right half 866. The left half of the burst 864 may include 3 tail bits 852*a*, 58 data bits 854*a* and an 8.25 bit guard period 818*a*. The right half of the burst 866 may include 3 tail bits 852*b*, 58 data bits 854*b* and an 8.25 bit guard period 818*b*.

Controlled sequence symbols 820*a,d* may be transmitted in the guard period 818. For example, controlled sequence symbols 820*a* may be transmitted in the guard period 818*a* of the left half of the burst 864. Controlled sequence symbols 820*d* may also be transmitted in the guard period 818*b* of the right half of the burst 866. In one implementation, the controlled sequence symbols 820*b* may be the last 8 bits of the training sequence 827, as described above in connection with FIG. 6.

In the embodiment illustrated in FIG. 8, the wireless communication device 104 may receive a cyclic prefix 870 for each half-burst 864, 866. The controlled sequence symbols 820*a* transmitted in the guard period 818*a* of the left half of the burst 864 may be the cyclic prefix 870*a* of the left half of the burst 864. The controlled sequence symbols 820*c* in the training sequence 827*b* of the right half of the burst 866 may be the cyclic prefix 870*b* of the right half of the burst 866.

Each half-burst 864, 866 may include a full training sequence 827. It should be noted that for the right half of the burst 866, the first two bits of the training sequence 827*b* (e.g., bit 0 and bit 1 of the training sequence 827*b*) may not be included. This may allow bit 2 to bit 9 of the training sequence 827*b* to operate as the cyclic prefix 870*b* for the right half of the burst 866. With this embodiment, transmissions in the guard period 818*a-b* may be identical for the left half of the burst 864 and the right half of the burst 866. This may allow the modified burst 816 to be transmitted on adjacent slots.

Figure 9:
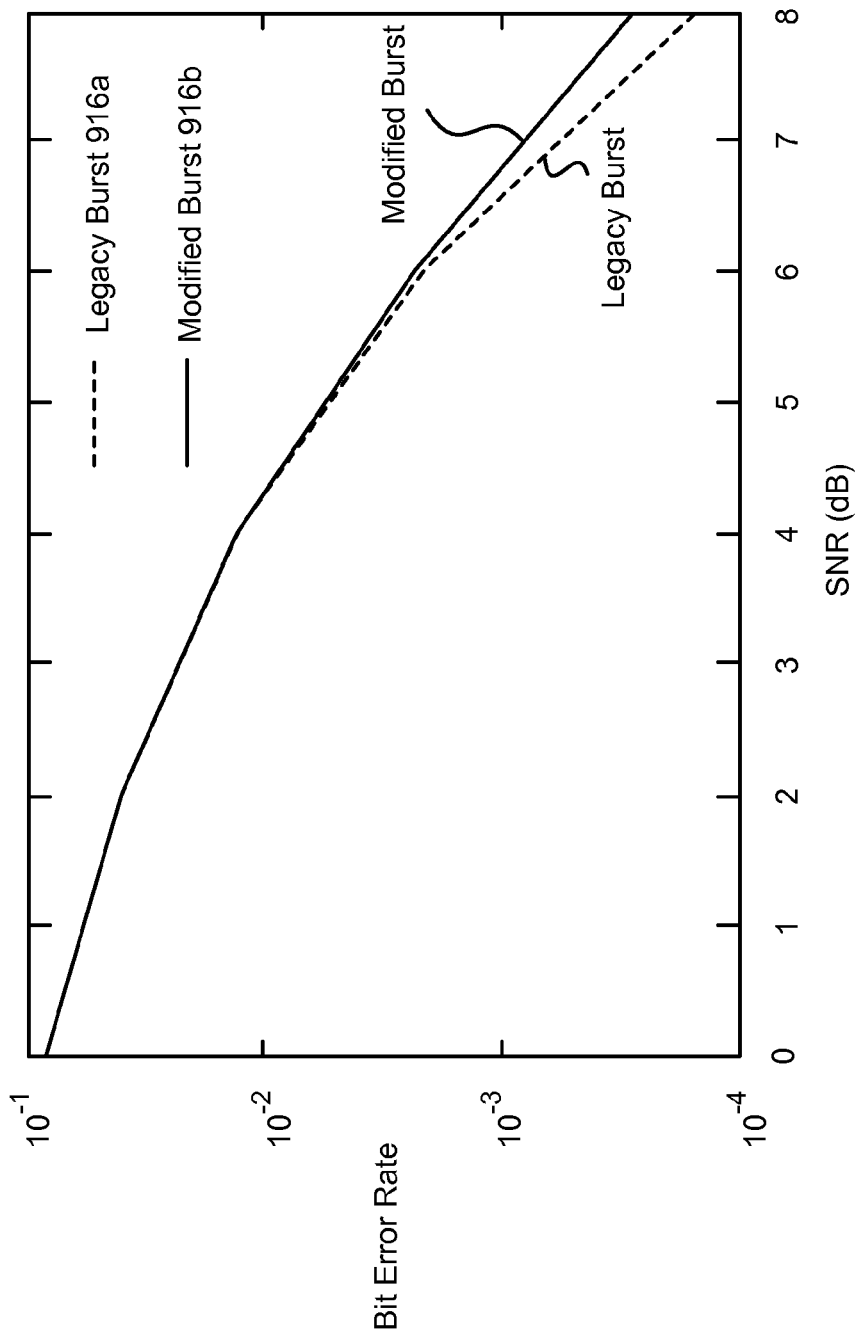
FIG. 9 is a graph illustrating the results of a base station assisted frequency domain equalization simulation of a 6 tap channel.

FIG. 9 is a graph illustrating the results of a base station 102 assisted frequency domain equalization simulation of a 6 tap channel. The graph was obtained during a simulation of base station 102 assisted frequency domain equalization according to the systems and methods described herein.

In this simulation, a BPSK transmission of a legacy burst 916*a* was performed. The legacy burst 916*a* included the following sequence: 8 guard symbols+3 TB+57 data+1 FACH+26 TSC+1 FACH+57 data+3 TB+8 guard symbols, where TB refers to tail bits 352, FACH refers to forward access channel bits, and TSC refers to training sequence bits 327. Additionally, a BPSK transmission of a modified burst 916*b* was performed. The modified burst 916*b* included the following sequence: 8 CP bits+3 TB+57 data+1 FACH+26 TSC+1 FACH+57 data+3 TB+8 CP bits, where CP refers to cyclic prefix bits 870.

A 7 tap channel was used. During this simulation, a Laurent's pulse shape for GMSK was not used. Seven independent taps were generated with a power delay profile of [0, −5, −10, −12, −15, −18, −20] decibels (dB). No Doppler was used and the channel was independently generated for each burst 916*a*, 916*b*.

During this simulation, the same channel and additive white Gaussian noise (AWGN) instances were used for both the legacy burst 916*a* and the modified burst 916*b* for transmission and reception. The simulation was performed for a 3, 4, 5, 6 and 7 tap channel.

For each tap length, a bit error rate (BER) before channel coding for the legacy burst 916*a* and the modified burst 916*b* was obtained at a signal to noise ratio (SNR) of [0, 2, 4, 6, 8] dB. A basic full MLSE receiver was used, with simple termination. There was no separate pre-filtering to condition the channel response to be minimum/maximum phase.

During this simulation, the following simulation results were collected for each simulation point: bit position wise BER for data bits in the left half and the right half of the burst 916*a*, 916*b*, a total BER for the left half of the burst 916*a*, 916*b*, a total BER for the right half of the burst 916*a*, 916*b*, and the total BER.

Based on the results of this simulation, it was observed that for the 3, 4 and 5 tap channels there was no impact of the modified burst 916*b* on the raw BER of an adjacent legacy burst 916*a*. For the 6 tap channel illustrated in FIG. 9, there was a slight increase in BER at high SNRs (6 to 8 dB) when the modified burst 916*b* was present adjacent to legacy burst 916*a*. Therefore, overall there was very minimal interference caused to a wireless communication device 104 because of the presence of a modified burst 916*b* in an adjacent slot.

Figure 10:
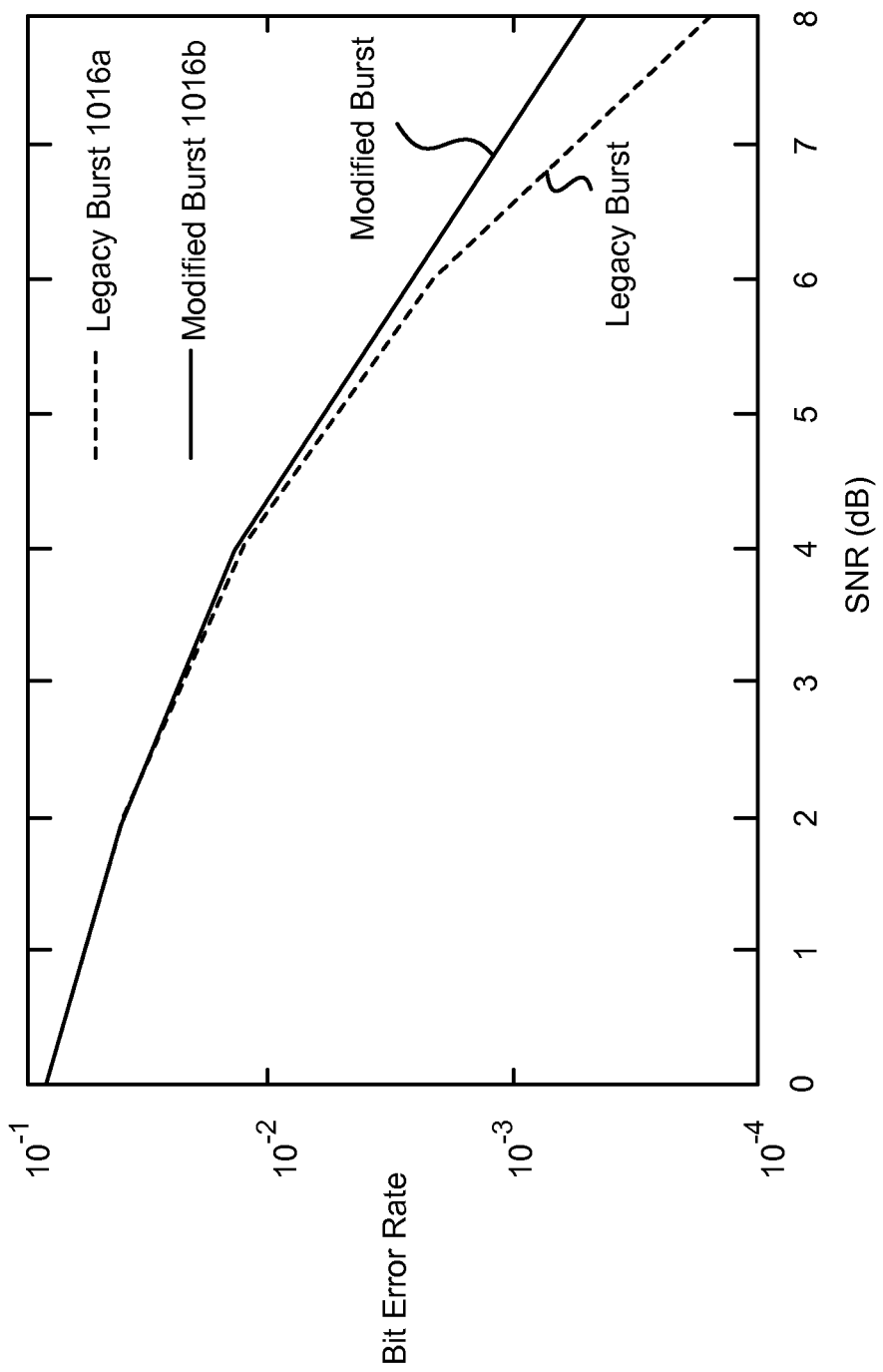
FIG. 10 is a graph illustrating the results of a base station assisted frequency domain equalization simulation of a 7 tap channel.

FIG. 10 is a graph illustrating the results of a base station 102 assisted frequency domain equalization simulation of a 7 tap channel. The simulation was performed as described above in connection with FIG. 9. For the 7 tap channel illustrated in FIG. 10, there was a slight increase in BER at high SNRs (6 to 8 dB) when the modified burst 1016*b* was present adjacent to legacy burst 1016*a*. Therefore, there was very minimal interference caused to a wireless communication device because of the presence of a modified burst 1016b in an adjacent slot.

FIG. 11 is a graph illustrating a phase response of a Gaussian minimum shift keying (GMSK) pulse. The accumulated phase response of a GMSK pulse is shown relative to GSM symbol time (Ts). In one configuration, the GSM symbol time (Ts) is 48/13e6 seconds. The primary region where the phase changes (because of GMSK pulse filtering) is between −1.5 symbol time (Ts) to +1.5 Ts. The overall channel seen from the wireless communication device 104 may be a convolution of a GMSK pulse shape and a channel delay spread, which may be 7 taps, as described above in connection with FIG. 6.

Figure 12:
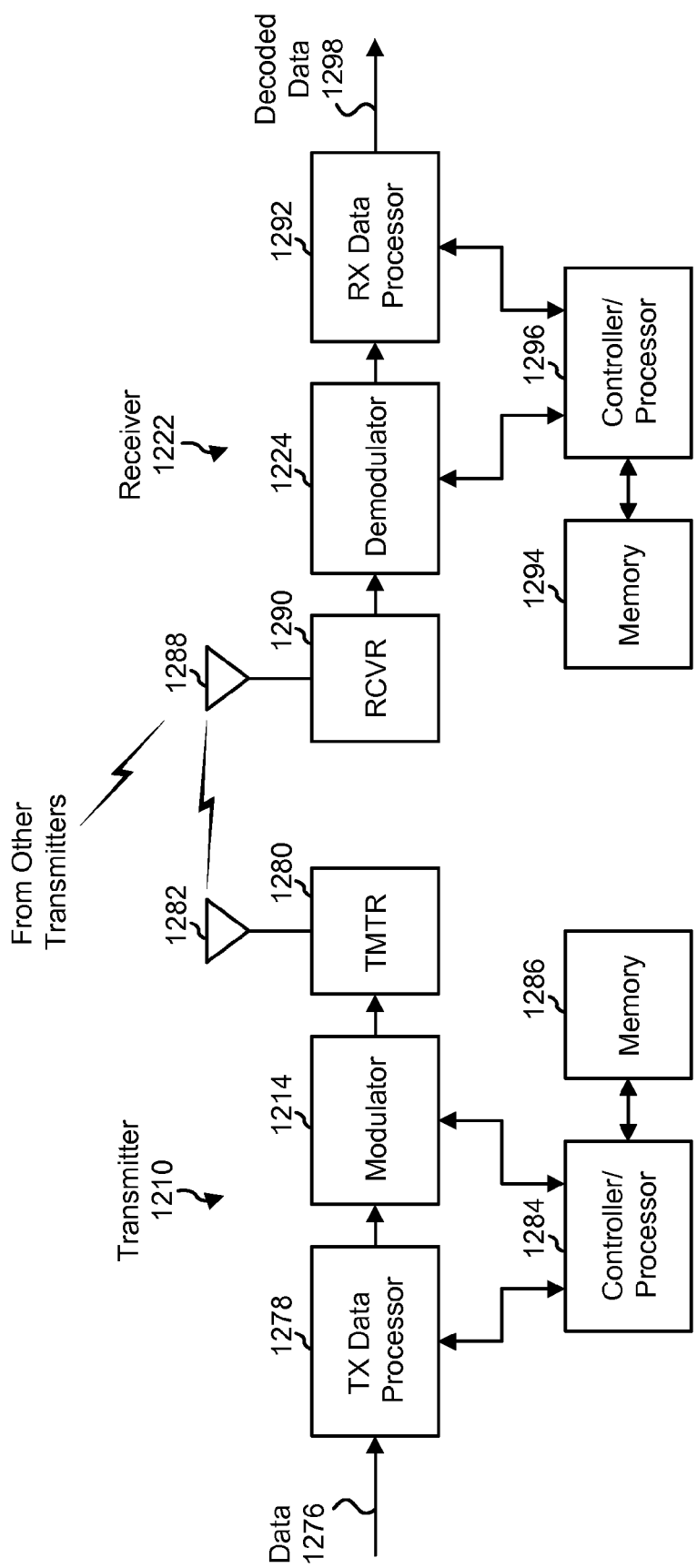
FIG. 12 shows a block diagram of a transmitter and a receiver in a wireless communication system.

FIG. 12 shows a block diagram of a transmitter 1210 and a receiver 1222 in a wireless communication system 100. For the downlink 106, the transmitter 1210 may be part of a base station 102 and the receiver 1222 may be part of a wireless communication device 104. For the uplink 108, the transmitter 1210 may be part of a wireless communication device 104 and the receiver 1222 may be part of a base station 102.

At the transmitter 1210, a transmit (TX) data processor 1278 receives and processes (e.g., formats, encodes, and interleaves) data 1276 and provides coded data. A modulator 1214 performs modulation on the coded data and provides a modulated signal. The modulator 1214 may perform Gaussian minimum shift keying (GMSK) for GSM, 8-phase shift keying (8-PSK) for Enhanced Data rates for Global Evolution (EDGE), etc. GMSK is a continuous phase modulation protocol whereas 8-PSK is a digital modulation protocol. The modulator 1214 may also perform modulation based on other higher-order modulation protocols (e.g., QPSK, QAM and/or 64-QAM). A transmitter unit (TMTR) 1280 conditions (e.g., filters, amplifies, and upconverts) the modulated signal and generates an RF modulated signal, which is transmitted via an antenna 1282.

At the receiver 1222, an antenna 1288 receives RF modulated signals from the transmitter 1210 and other transmitters. The antenna 1288 provides a received RF signal to a receiver unit (RCVR) 1290. The receiver unit 1290 conditions (e.g., filters, amplifies, and downconverts) the received RF signal, digitizes the conditioned signal, and provides samples. A demodulator 1224 processes the samples as described below and provides demodulated data. A receive (RX) data processor 1292 processes (e.g., deinterleaves and decodes) the demodulated data and provides decoded data 1298. In general, the processing by demodulator 1224 and RX data processor 1292 is complementary to the processing by the modulator 1214 and the TX data processor 1278, respectively, at the transmitter 1210.

Controllers/processors 1284 and 1296 direct operation at the transmitter 1210 and receiver 1222, respectively. Memories 1286 and 1294 store program codes in the form of computer software and data used by the transmitter 1210 and receiver 1222, respectively.

Figure 13:
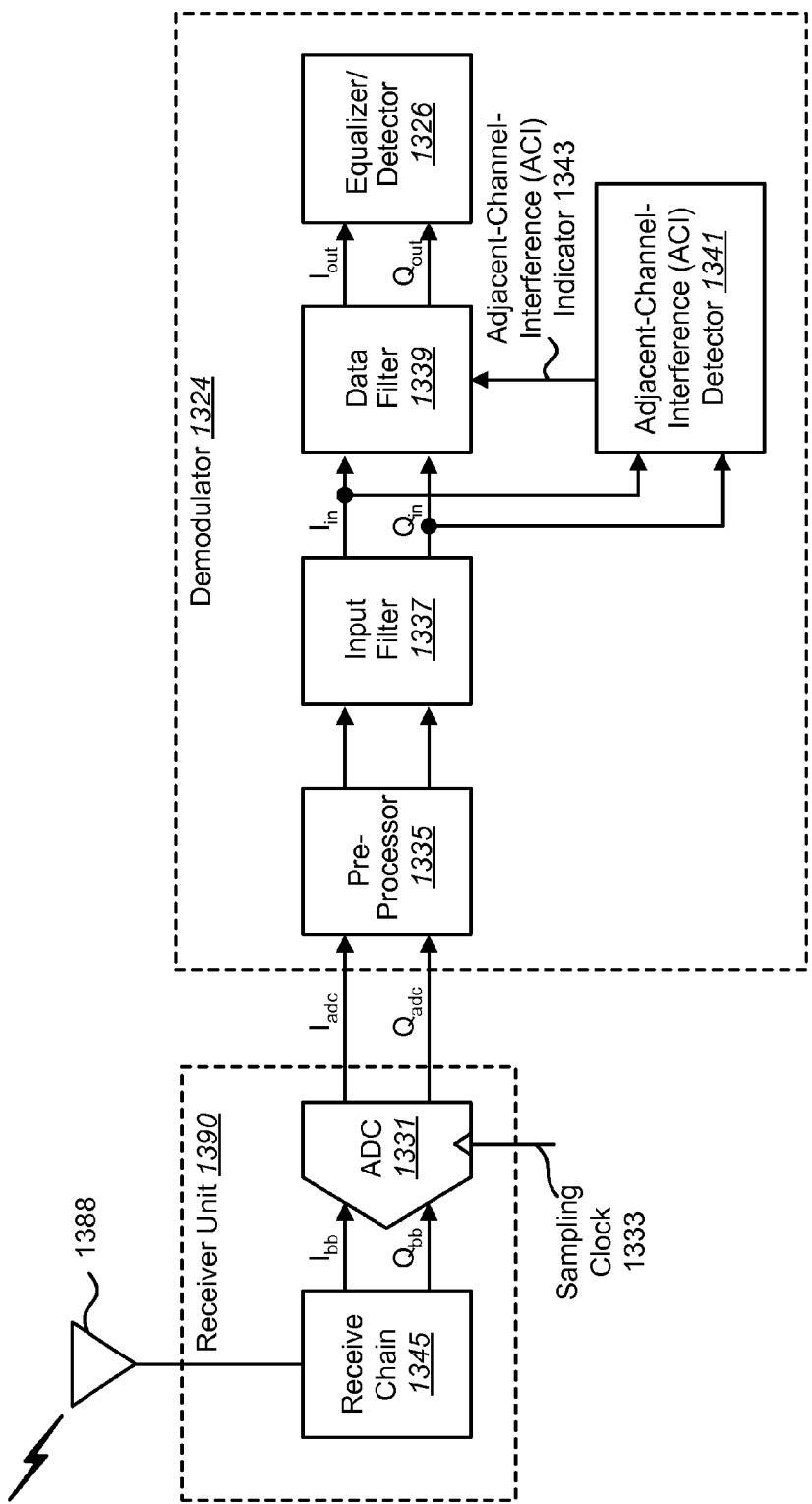
FIG. 13 shows a block diagram of a design of a receiver unit and a demodulator at a receiver.

FIG. 13 shows a block diagram of a design of a receiver unit 1390 and a demodulator 1324 at a receiver 122. Within the receiver unit 1390, a receive chain 1345 processes the received RF signal and provides I (inphase) and Q (quadrature) baseband signals, which are denoted as $I_{bb}$ and $Q_{bb}$. The receive chain 1345 receives RF modulated signals from an antenna 1388. The receive chain 1345 may perform low noise amplification, analog filtering, quadrature downconversion, etc. An analog-to-digital converter (ADC) 1331 digitizes the I and Q baseband signals at a sampling rate of $I_{adc}$ from a sampling clock 1333 and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within the demodulator 1324, a pre-processor 1335 performs pre-processing on the I and Q samples from the analog-to-digital converter (ADC) 1331. For example, the pre-processor 1335 may remove direct current (DC) offset, remove frequency offset, etc. An input filter 1337 filters the samples from the pre-processor 1335 based on a particular frequency response and provides input I and Q samples, which are denoted as $I_{in}$ and $Q_{in}$. The input filter 1337 may filter the I and Q samples to suppress images resulting from the sampling by the analog-to-digital converter (ADC) 1331 as well as jammers. The input filter 1337 may also perform sample rate conversion, e.g., from 24× oversampling down to 2× oversampling.

A data filter 1339 filters the input I and Q samples from the input filter 1337 based on another frequency response and provides output I and Q samples, which are denoted as $I_{out}$ and $Q_{out}$. The input filter 1337 and the data filter 1339 may be implemented with finite impulse response (FIR) filters, infinite impulse response (IIR) filters, or filters of other types. The frequency responses of the input filter 1337 and the data filter 1339 may be selected to achieve good performance. In one design, the frequency response of the input filter 1337 is fixed and the frequency response of the data filter 1339 is configurable.

An adjacent-channel-interference (ACI) detector 1341 receives the input I and Q samples from the input filter 1337, detects for adjacent-channel-interference (ACI) in the received RF signal, and provides an adjacent-channel-interference (ACI) indicator 1343 to the data filter 1339. The adjacent-channel-interference (ACI) indicator 1343 may indicate whether or not adjacent-channel-interference (ACI) is present and, if present, whether the adjacent-channel-interference (ACI) is due to the higher RF channel centered at +200 kilohertz (kHz) and/or the lower RF channel centered at −200 kHz. The frequency response of the data filter 1339 may be adjusted based on the adjacent-channel-interference (ACI) indicator 1343, to achieve desirable performance.

An equalizer/detector 1326 receives the output I and Q samples from the data filter 1339 and performs equalization, matched filtering, detection and/or other processing on these samples. For example, the equalizer/detector 1326 may implement a frequency domain equalization using forward regression and backward regression to establish a probability of a particular bit state (e.g., 1 or 0) based on all bits given a sequence of I and Q samples.

Figure 14:
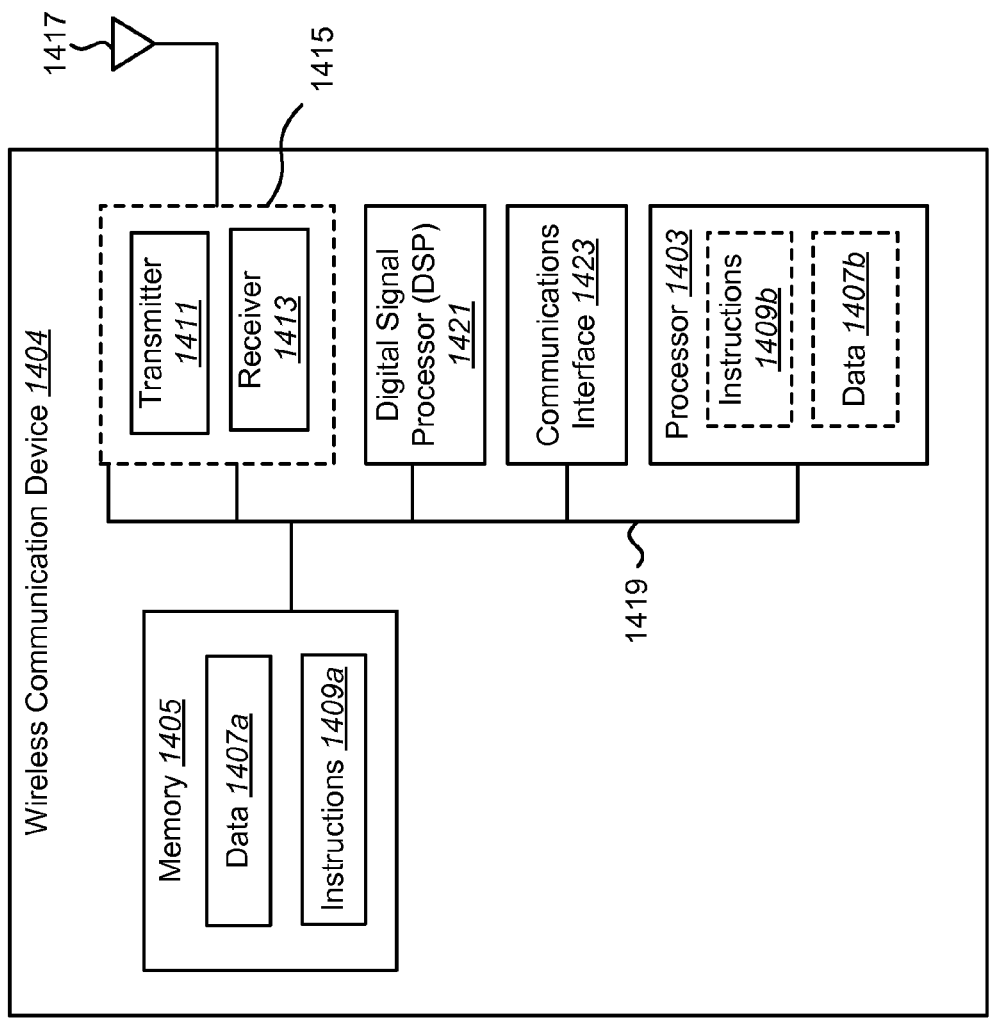
FIG. 14 illustrates certain components that may be included within a wireless communication device according to some embodiments of the present invention.

FIG. 14 illustrates certain components that may be included within a wireless communication device 1404 according to some embodiments of the present invention. The wireless communication device 1404 may be an access terminal, a mobile station, a user equipment (UE), etc. For example, the wireless communication device 1404 may be the wireless communication device 104 of FIG. 1.

The wireless communication device 1404 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the wireless communication device 1404 of FIG. 14, in an alternative configuration, a combination of processors (e.g., an ARM and DSP) could be used.

The wireless communication device 1404 also includes memory 1405. The memory 1405 may be any electronic component capable of storing electronic information. The memory 1405 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1407a and instructions 1409a may be stored in the memory 1405. The instructions 1409a may be executable by the processor 1403 to implement the methods disclosed herein. Executing the instructions 1409a may involve the use of the data 1407a that is stored in the memory 1405. When the processor 1403 executes the instructions 1409, various portions of the instructions 1409b may be loaded onto the processor 1403, and various pieces of data 1407b may be loaded onto the processor 1403.

The wireless communication device 1404 may also include a transmitter 1411 and a receiver 1413 to allow transmission and reception of signals to and from the wireless communication device 1404 via one or more antennas 1417. The transmitter 1411 and receiver 1413 may be collectively referred to as a transceiver 1415. The wireless communication device 1404 may also include (not shown) multiple transmitters, additional antennas, multiple receivers and/or multiple transceivers.

The wireless communication device 1404 may include a digital signal processor (DSP) 1421. The wireless communication device 1404 may also include a communications interface 1423. The communications interface 1423 may allow a user to interact with the wireless communication device 1404.

The various components of the wireless communication device 1404 may be coupled together by one or more buses, which may include a power bus, a control signal bus, a status signal bus, a data bus, etc. For the sake of clarity, the various buses are illustrated in FIG. 14 as a bus system 1419.

Figure 15:
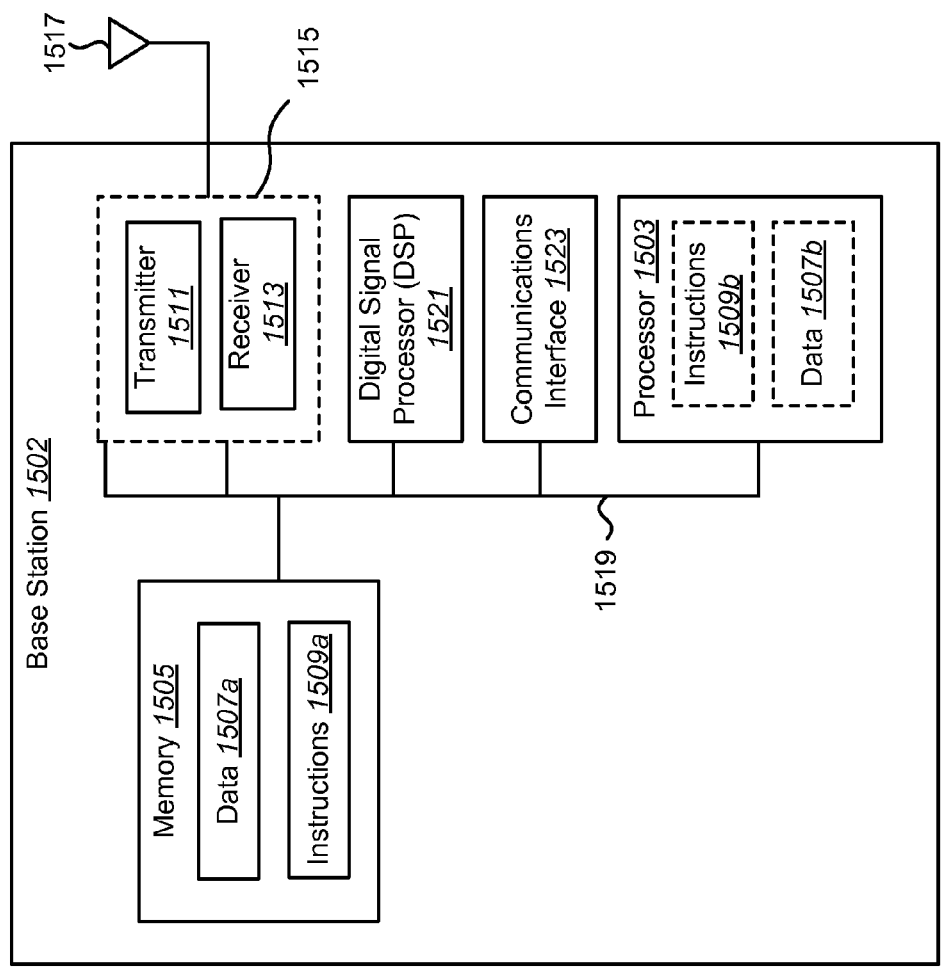
FIG. 15 illustrates certain components that may be included within a base station according to some embodiments of the present invention.

FIG. 15 illustrates certain components that may be included within a base station 1502 according to some embodiments of the present invention. A base station 1502 may also be referred to as, and may include some or all of the functionality of, an access point, a broadcast transmitter, a NodeB, an evolved NodeB, etc. For example, the base station 1502 may be the base station 102 of FIG. 1.

The base station 1502 includes a processor 1503. The processor 1503 may be a general purpose single- or multi-chip microprocessor (e.g., an ARM), a special purpose microprocessor (e.g., a digital signal processor (DSP)), a microcontroller, a programmable gate array, etc. The processor 1503 may be referred to as a central processing unit (CPU). Although just a single processor 1503 is shown in the base station 1502 of FIG. 15, in an alternative configuration, a combination of processors (e.g., an ARM and DSP) could be used.

The base station 1502 also includes memory 1505. The memory 1505 may be any electronic component capable of storing electronic information. The memory 1505 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1507a and instructions 1509a may be stored in the memory 1505. The instructions 1509a may be executable by the processor 1503 to implement the methods disclosed herein. Executing the instructions 1509a may involve the use of the data 1507a that is stored in the memory 1505. When the processor 1503 executes the instructions 1509a, various portions of the instructions 1509b may be loaded onto the processor 1503, and various pieces of data 1507b may be loaded onto the processor 1503.

The base station 1502 may also include a transmitter 1511 and a receiver 1513 to allow transmission and reception of signals to and from the base station 1502. The transmitter 1511 and receiver 1513 may be collectively referred to as a transceiver 1515. An antenna 1517 may be electrically coupled to the transceiver 1515. The base station 1502 may also include (not shown) multiple transmitters, multiple receivers, multiple transceivers and/or additional antennas.

The base station 1502 may include a digital signal processor (DSP) 1521. The base station 1502 may also include a communications interface 1523. The communications interface 1523 may allow a user to interact with the base station 1502.

The various components of the base station 1502 may be coupled together by one or more buses, which may include a power bus, a control signal bus, a status signal bus, a data bus, etc. For the sake of clarity, the various buses are illustrated in FIG. 15 as a bus system 1519.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

I claim:

1. A method for wireless communication, comprising:
receiving a burst that comprises controlled sequence symbols, wherein:
the burst comprises a first guard period, first data, a training sequence, second data, and a second guard period,
a first predetermined number of first symbols of the training sequence are the same as the first predetermined number of last symbols of the training sequence,
a first half of the burst comprises the first guard period, the first data, and the first predetermined number of first symbols of the training sequence, the first guard period being included at the beginning of the first half of the burst and the first data being between the first guard period and the training sequence,
a second half of the burst comprises a second predetermined number of last symbols of the training sequence, the second data, and the second guard period, the second guard period being included at the end of the second half of the burst and the second data being between the training sequence and the second guard period,
the controlled sequence symbols comprise the second predetermined number of last symbols of the training sequence,
the first predetermined number is greater than the second predetermined number, and
the first guard period and the second guard period comprise the controlled sequence symbols; and
demodulating the burst based on the controlled sequence symbols.

2. The method of claim 1, wherein the second predetermined number is in the range of 1 to 8.

3. The method of claim 1, wherein the controlled sequence symbols in the first guard period are used as a cyclic prefix for the first half of the burst.

4. The method of claim 3, wherein the cyclic prefix comprises an orthogonal frequency division multiplexing cyclic prefix.

5. The method of claim 1, wherein the burst is received as a Global System for Mobile Communications transmission.

6. The method of claim 1, wherein the demodulating comprises performing a frequency domain equalization.

7. The method of claim 6, wherein the frequency domain equalization is performed based on a circular convolution.

8. The method of claim 1, wherein the demodulating is performed by an orthogonal frequency division multiplexing receiver.

9. The method of claim 1, wherein the demodulating is based on forward regression and backward regression.

10. The method of claim 1, wherein the demodulating comprises determining a bit state probability for each received bit based on all received bits.

11. The method of claim 1, further comprising decoding the demodulated burst.

12. An apparatus for wireless communication, comprising:
a processor;
memory in electronic communication with the processor; and
instructions stored in the memory, the instructions being executable by the processor to:
receive a burst that comprises controlled sequence symbols, wherein:
the burst comprises a first guard period, first data, a training sequence, second data, and a second guard period,
a first predetermined number of first symbols of the training sequence are the same as the first predetermined number of last symbols of the training sequence,
a first half of the burst comprises the first guard period, the first data, and the first predetermined number of first symbols of the training sequence, the first guard period being included at the beginning of the first half of the burst and the first data being between the first guard period and the training sequence,
a second half of the burst comprises a second predetermined number of last symbols of the training sequence, the second data, and the second guard period, the second guard period being included at the end of the second half of the burst and the second data being between the training sequence and the second guard period,
the controlled sequence symbols comprise the second predetermined number of last symbols of the training sequence,
the first predetermined number is greater than the second predetermined number, and
the first guard period and the second guard period comprise the controlled sequence symbols; and
demodulate the burst based on the controlled sequence symbols.

13. The apparatus of claim 12, wherein the second predetermined number is in the range of 1 to 8.

14. The apparatus of claim 12, wherein the controlled sequence symbols in the first guard period are used as a cyclic prefix for the first half of the burst.

15. The apparatus of claim 14, wherein the cyclic prefix comprises an orthogonal frequency division multiplexing cyclic prefix.

16. The apparatus of claim 12, wherein the instructions executable to demodulate comprise instructions executable to perform frequency domain equalization.

17. The apparatus of claim 16, wherein the frequency domain equalization is performed based on a circular convolution.

18. The apparatus of claim 12, wherein the instructions executable to demodulate comprise instructions executable to determine a bit state probability for each received bit based on all received bits.

19. A wireless device comprising:
means for receiving a burst that comprises controlled sequence symbols, wherein:
the burst comprises a first guard period, first data, a training sequence, second data, and a second guard period,
a first predetermined number of first symbols of the training sequence are the same as the first predetermined number of last symbols of the training sequence,
a first half of the burst comprises the first guard period, the first data, and the first predetermined number of first symbols of the training sequence, the first guard period being included at the beginning of the first half of the burst and the first data being between the first guard period and the training sequence,
a second half of the burst comprises a second predetermined number of last symbols of the training sequence, the second data, and the second guard period, the second guard period being included at the end of the second half of the burst and the second data being between the training sequence and the second guard period,
the controlled sequence symbols comprise the second predetermined number of last symbols of the training sequence,
the first predetermined number is greater than the second predetermined number, and
the first guard period and the second guard period comprise the controlled sequence symbols; and
means for demodulating the burst based on the controlled sequence symbols.

20. The wireless device of claim 19, wherein the controlled sequence symbols in the first guard period are used as a cyclic prefix for the first half of the burst.

21. The wireless device of claim 20, wherein the second predetermined number is in the range of 1 to 8.

22. The wireless device of claim 19, wherein the means for demodulating comprise means for performing frequency domain equalization.

23. A non-transitory computer-readable medium having instructions thereon, the instructions comprising:
code for causing a wireless communication device to receive a burst that comprises controlled sequence symbols, wherein:
the burst comprises a first guard period, first data, a training sequence, second data, and a second guard period,
a first predetermined number of first symbols of the training sequence are the same as the first predetermined number of last symbols of the training sequence,
a first half of the burst comprises the first guard period, the first data, and the first predetermined number of first symbols of the training sequence, the first guard period being included at the beginning of the first half of the burst and the first data being between the first guard period and the training sequence,
a second half of the burst comprises a second predetermined number of last symbols of the training sequence, the second data, and the second guard period, the second guard period being included at the end of the second half of the burst and the second data being between the training sequence and the second guard period,
the controlled sequence symbols comprise the second predetermined number of last symbols of the training sequence,
the first predetermined number is greater than the second predetermined number, and the first guard period and the second guard period comprise the controlled sequence symbols; and
code for causing the wireless communication device to demodulate the burst based on the controlled sequence symbols.

24. The non-transitory computer-readable medium of claim 23, wherein the second predetermined number is in the range of 1 to 8.

25. The non-transitory computer-readable medium of claim 23, wherein the controlled sequence symbols in the first guard period are used as a cyclic prefix for the first half of the burst.

26. The non-transitory computer-readable medium of claim 23, wherein the code for causing the wireless communication device to demodulate comprises code for causing the wireless communication device to perform frequency domain equalization.

* * * * *